United States Patent
Mitsumori

(10) Patent No.: US 9,325,613 B2
(45) Date of Patent: Apr. 26, 2016

(54) COMMUNICATION DEVICE AND ADDRESS LEARNING METHOD

(71) Applicant: FUJITSU LIMITED, Kawasaki-shi, Kanagawa (JP)

(72) Inventor: Yasuyuki Mitsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 13/942,980

(22) Filed: Jul. 16, 2013

(65) Prior Publication Data

US 2014/0086250 A1    Mar. 27, 2014

(30) Foreign Application Priority Data

Sep. 27, 2012 (JP) .................................. 2012-215174

(51) Int. Cl.
*H04L 12/28* (2006.01)
*H04L 12/721* (2013.01)
*H04L 12/935* (2013.01)
*H04L 12/00* (2006.01)

(52) U.S. Cl.
CPC .............. *H04L 45/72* (2013.01); *H04L 49/30* (2013.01); *H04L 12/00* (2013.01)

(58) Field of Classification Search
CPC .............................. H04L 45/02; H04L 45/742
See application file for complete search history.

(56) References Cited

U.S. PATENT DOCUMENTS

2004/0120269 A1* 6/2004 Sumino et al. ............... 370/255
2010/0002702 A1* 1/2010 Saito et al. .................... 370/392

FOREIGN PATENT DOCUMENTS

JP   2004-194145   7/2004
JP   2006-303968   11/2006
JP   2010-114724   5/2010

OTHER PUBLICATIONS

IEEE Computer Society, *IEEE Standard for Local and Metropolitan Area Networks: Media Access Control (MAC) Bridges*, New York, The Institute of Electrical and Electronics Engineers, Inc., Jun. 2004, pp. 1-269.
Japanese Office Action dated Mar. 8, 2016 in corresponding Japanese Patent Application No. 2012-215174.

* cited by examiner

*Primary Examiner* — Chi H Pham
*Assistant Examiner* — Fahmida Chowdhury
(74) *Attorney, Agent, or Firm* — Staas & Halsey LLP

(57) ABSTRACT

A communication device includes a first memory configured to store transfer information for controlling frame transfer; a processor configured to register a transmission source address of a received frame and corresponding transfer information in the first memory; and a second memory configured to store an upper limit number of registrable addresses for each of designated groups, wherein the processor is configured to determine whether or not the transmission source address of the received frame is registrable in the first memory, based on a result of comparison between a number of registered addresses in a group corresponding to the received frame and an upper limit number assigned to the group corresponding to the received frame.

19 Claims, 27 Drawing Sheets

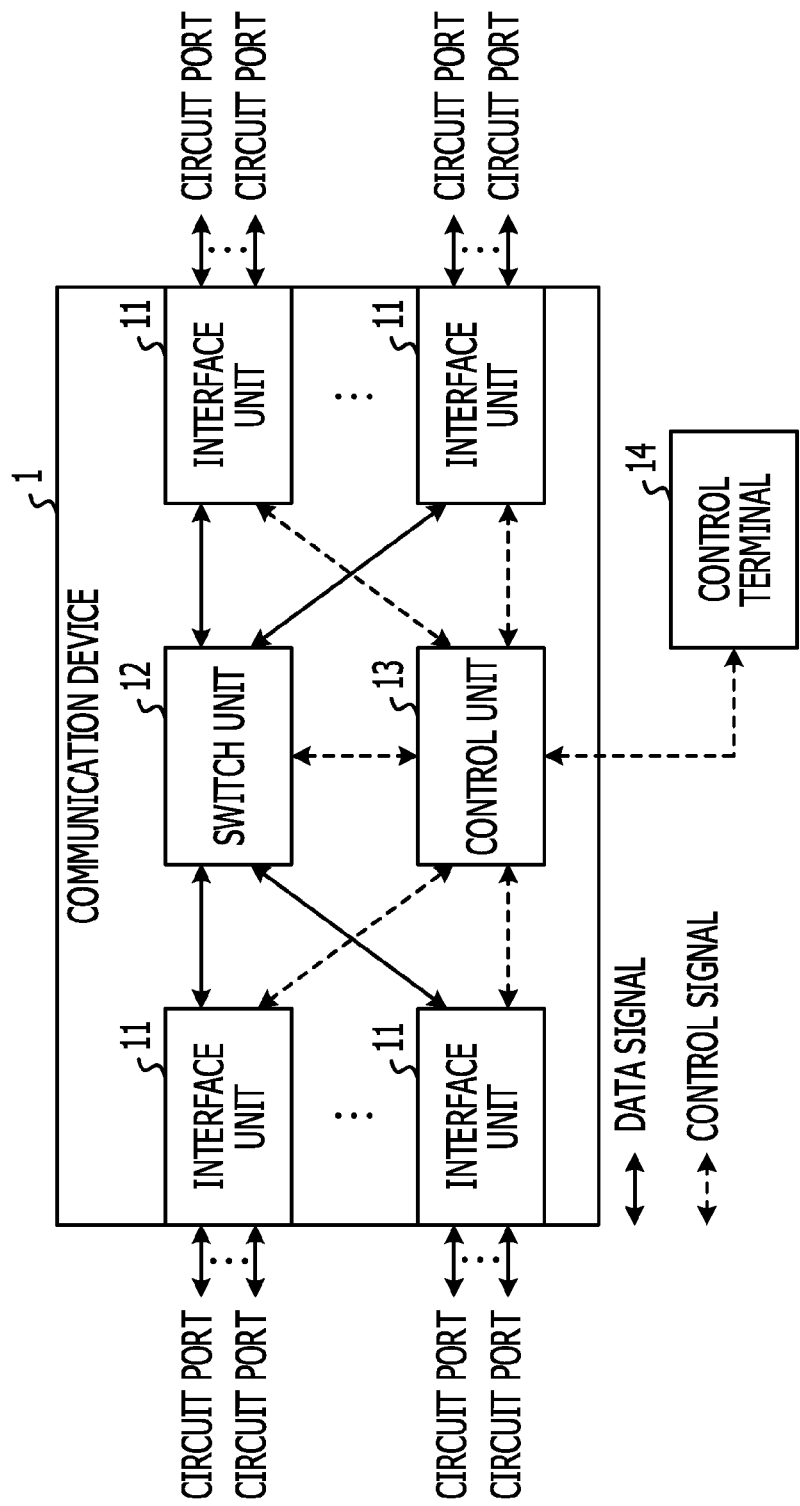

FIG. 3A

| MAC DA (48) | MAC SA (48) | E-TYPE (16) | PDU (VARIABLE LENGTH) | FCS (32) |

FIG. 3B

| MAC DA (48) | MAC SA (48) | VLAN TAG (32) | E-TYPE (16) | PDU (VARIABLE LENGTH) | FCS (32) |

| TPID (16) | PRIORITY (3) | DEI (1) | VLAN ID (12) |

FIG. 6A

INDEX:
TRANSMISSION SOURCE IF CARD NUMBER
+ TRANSMISSION SOURCE PORT NUMBER

| | V | PORT ID | LEARNING UPPER LIMIT NUMBER | AGING TIME | FRAME COPY INFORMATION | | | |
|---|---|---|---|---|---|---|---|---|
| | | | | | COP0 | COP1 | ... | CmPn |
| CARD NUMBER #0 + PORT NUMBER #0 | 1 | 1 | 100 | 5 MIN | 0 | 1 | ... | 0 |
| CARD NUMBER #0 + PORT NUMBER #1 | 1 | 1 | 100 | 5 MIN | 1 | 0 | ... | 0 |
| CARD NUMBER #0 + PORT NUMBER #2 | 1 | 2 | 300 | 3 MIN | 1 | 0 | ... | 0 |
| | | | | | | | | |
| CARD NUMBER #M + PORT NUMBER #N | 0 | 0 | 0 | 0 | 0 | 0 | ... | 0 |

INDEX: PORT ID

| | LEARNING NUMBER |
|---|---|
| PORT ID #0 | 0 |
| PORT ID #1 | 70 |
| PORT ID #2 | 30 |
| ... | ... |
| PORT ID #K | 0 |

INDEX: MAC ADDRESS

| V | IF CARD NUMBER | PORT NUMBER | AGING TIME |
|---|---|---|---|

FIG. 9A

| INDEX: VID | V | PORT ID | LEARNING UPPER LIMIT NUMBER | AGING TIME | FRAME COPY INFORMATION | | | |
|---|---|---|---|---|---|---|---|---|
| | | | | | COP0 | COP1 | ... | CmPn |
| VID#0 | 1 | 1 | 100 | 5 MIN | 0 | 1 | ... | 0 |
| VID#1 | 1 | 1 | 100 | 5 MIN | 1 | 0 | ... | 0 |
| VID#2 | 1 | 2 | 300 | 3 MIN | 1 | 0 | ... | 0 |
| VID#N | 0 | 0 | 0 | 0 | 0 | 0 | ... | 0 |

| INDEX: SERVICE ID | LEARNING NUMBER |
|---|---|
| SERVICE ID #0 | 0 |
| SERVICE ID #1 | 70 |
| SERVICE ID #2 | 30 |
| ... | ... |
| SERVICE ID #K | 0 |

| INDEX: MAC ADDRESS | V | SERVICE ID | IF CARD NUMBER | PORT NUMBER | AGING TIME |
|---|---|---|---|---|---|

Table 51: Index: VID

| INDEX: VID | V | SERVICE ID | LEARNING UPPER LIMIT NUMBER | | | FRAME COPY INFORMATION | | |
|---|---|---|---|---|---|---|---|---|
| | | | HIGH PRIORITY | MEDIUM PRIORITY | LOW PRIORITY | HIGH PRIORITY | MEDIUM PRIORITY | LOW PRIORITY |
| VID#0 | 1 | 1 | 400 | 300 | 100 | 5 MIN | 3 MIN | 1 MIN |
| VID#1 | 1 | 2 | 500 | 400 | 100 | 5 MIN | 5 MIN | 5 MIN |
| VID#2 | 1 | 3 | 0 | 300 | 100 | 0 MIN | 2 MIN | 1 MIN |
| ... | | | | | | | | |
| VID#N | 0 | 0 | 0 | 0 | 0 | 0 | 0 | 0 |

FIG. 12B

Table 52: Index: SERVICE ID

| INDEX: SERVICE ID | LEARNING NUMBER | | |
|---|---|---|---|
| | HIGH PRIORITY | MEDIUM PRIORITY | LOW PRIORITY |
| SERVICE ID #0 | 55 | 30 | 70 |
| SERVICE ID #1 | 357 | 287 | 98 |
| SERVICE ID #2 | 0 | 300 | 100 |
| ... | | | |
| SERVICE ID #K | 0 | 0 | 0 |

FIG. 12C

| LEARNING NUMBER | | |
|---|---|---|
| HIGH PRIORITY | MEDIUM PRIORITY | LOW PRIORITY |
| 412 | 617 | 268 |

| V | MAC ADDRESS | SERVICE ID | LEARNING PRIORITY | IF CARD NUMBER | PORT NUMBER | AGING TIME |

INDEX: MAC ADDRESS

| VID | LEARNING UPPER LIMIT NUMBER | | | |
|---|---|---|---|---|
| | HIGH PRIORITY | MEDIUM PRIORITY | LOW PRIORITY | |
| 1 | 4,000 | 6,000 | 0 | HIGH SERVICE USER |
| 3 | 4,000 | 6,000 | 0 | HIGH SERVICE USER |
| 5 | 0 | 4,000 | 6,000 | MEDIUM SERVICE USER |
| 7 | 0 | 3,000 | 7,000 | MEDIUM SERVICE USER |
| 9 | 0 | 0 | 10,000 | LOW SERVICE USER |

MAXIMUM ENTRY NUMBER OF MAC ADDRESS TABLE: 10,000

FIG. 23A

| INDEX: VID | SERVICE ID | CLASS ID | LEARNING UPPER LIMIT NUMBER | | | AGING TIME | | |
|---|---|---|---|---|---|---|---|---|
| | | | HIGH PRIORITY | MEDIUM PRIORITY | LOW PRIORITY | HIGH PRIORITY | MEDIUM PRIORITY | LOW PRIORITY |
| VID#0 | 1 | 0 | 400 | 300 | 100 | 5 MIN | 3 MIN | 1 MIN |
| VID#1 | 2 | 0 | 500 | 400 | 100 | 5 MIN | 5 MIN | 5 MIN |
| VID#2 | 3 | 1 | 0 | 300 | 100 | 0 MIN | 2 MIN | 1 MIN |
| ⋮ | | | | | ⋮ | | | |
| VID#N | 0 | 0 | 0 | 0 | 0 | 0 | ⋯ | 0 |

61

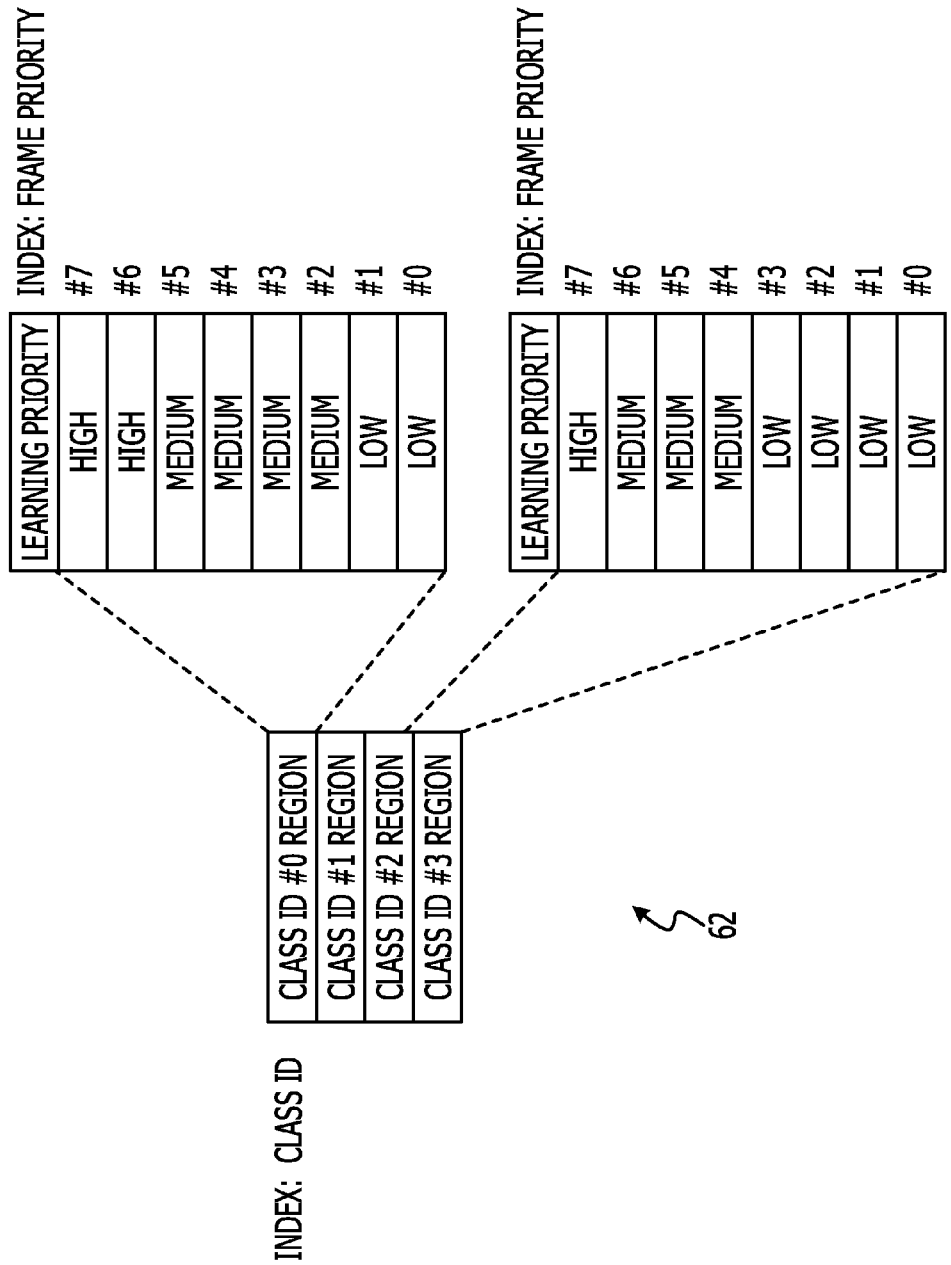

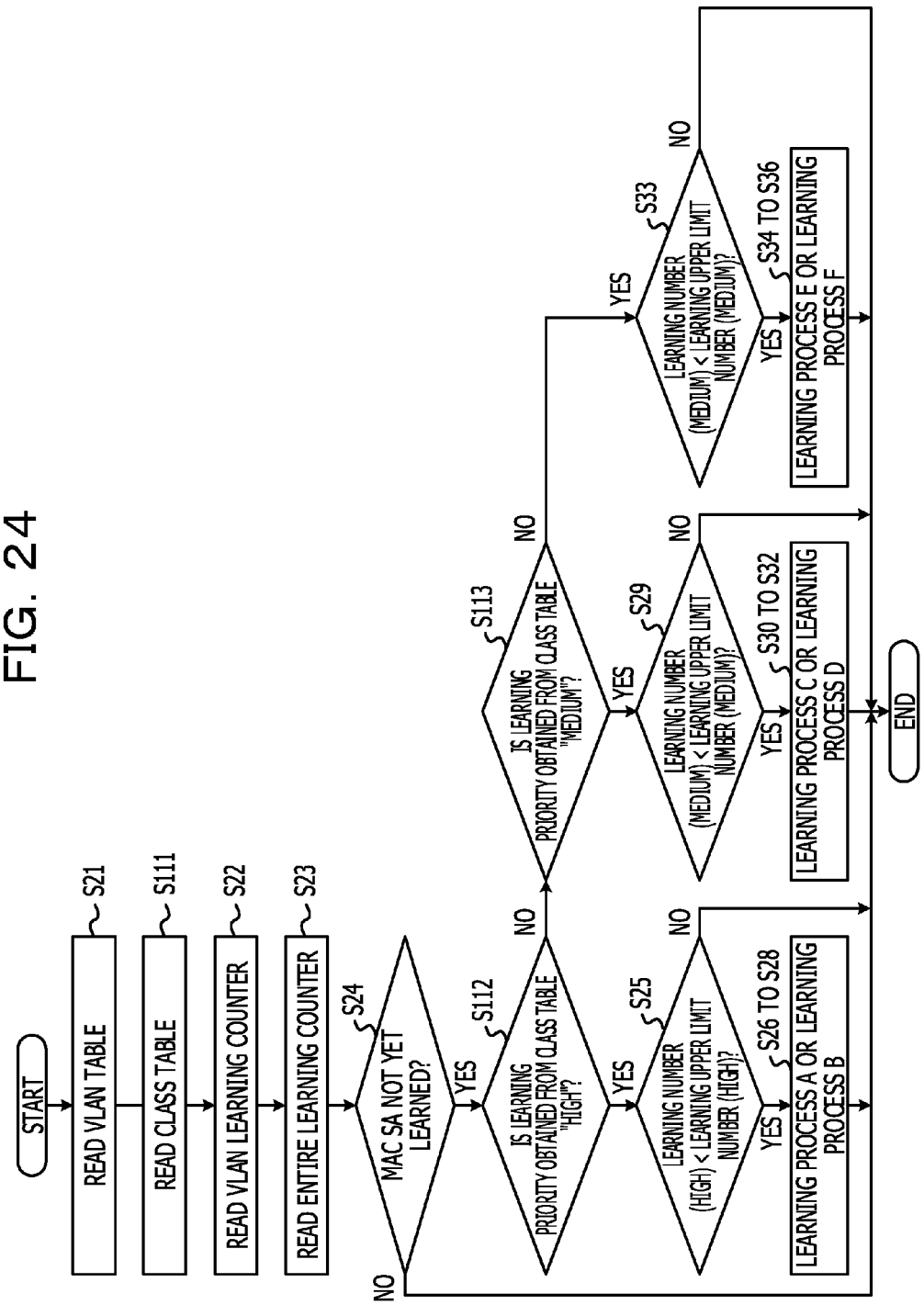

COMMUNICATION DEVICE AND ADDRESS LEARNING METHOD

CROSS-REFERENCE TO RELATED APPLICATION

This application is based upon and claims the benefit of priority from the prior Japanese Patent Application No. 2012-215174 filed on Sep. 27, 2012, the entire contents of which are incorporated herein by reference.

FIELD

The embodiment discussed herein is related to a communication device for controlling frame transfer.

BACKGROUND

With the expanding use of the Internet and mobile communications, carrier networks provided by communications firms are shifting from time division multiplexing (TDM) network, such as Synchronous Optical NETwork/Synchronous Digital Hierarch (SONET/SDH), to packet networks utilizing the Ethernet (registered trademark) technique and the Internet protocol (IP) technique. In the packet networks including wide-area Ethernet service, a mobile network, and so on, a frame transfer process is performed by learning a media access control (MAC) address of a frame.

In a communication device such as a frame transfer device, the learning of the MAC address is realized by registering, in a MAC address table, a transmission source MAC address of a received frame and input port information of the received frame. The input port information includes, for example, a card number identifying an interface card, and a port number identifying a physical communication port. In the frame transfer device, for example, when a frame arrives at some one physical communication port of some one interface card, the card number identifying the relevant interface card and the port number identifying the relevant physical communication port are registered in the MAC address table together with the transmission source MAC address of the received frame.

The frame transfer device transfers the received frame by employing the above-mentioned MAC address table. In more detail, the frame transfer device searches the MAC address table using a destination MAC address of the received frame, thereby specifying a card number and a port number corresponding to the destination. The frame transfer device then transmits the frame via the specified communication port of the specified interface card.

When the destination MAC address of the received frame is not yet learned (i.e., when the destination MAC address of the received frame is not registered in the MAC address table), the frame transfer device transfers the relevant frame via all the communication ports by broadcasting. Such broadcast transfer is often called "flooding".

For example, Japanese Laid-open Patent Publication No. 2010-114724, IEEE Std 802.1D-2004, and so on are disclosed as related art.

In the learning of the MAC address according to the related art, when a new MAC address is detected, the new MAC address is simply registered in a blank entry of the MAC address table. Therefore, for example, when the learning is performed on a large amount of MAC addresses regarding a particular user, many entries of the MAC address table are occupied by the particular user, and the learning of the MAC address regarding other users is not performed. In such a case, a great deal of flooding is generated for traffics related to the other users, and a network is congested. Thus, according to the related art, network resources (herein, entries of the MAC address table) may not be equally allocated to individual users.

The above-described problem is not concerned only with the learning of the MAC address, and it may occur in a communication device storing, in a memory, information for controlling a frame transfer destination.

SUMMARY

According to an aspect of the invention, a communication device includes a first memory configured to store transfer information for controlling frame transfer; a processor configured to register a transmission source address of a received frame and corresponding transfer information in the first memory; and a second memory configured to store an upper limit number of registrable addresses for each of designated groups, wherein the processor is configured to determine whether or not the transmission source address of the received frame is registrable in the first memory, based on a result of comparison between a number of registered addresses in a group corresponding to the received frame and an upper limit number assigned to the group corresponding to the received frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates one example of configuration of the communication device;

FIGS. 3A and 3B each illustrate one example of a format of a frame transferred by the communication device;

FIGS. 6A, 6B and 6C illustrate respective examples of tables managed in the first embodiment;

FIGS. 9A, 9B and 9C illustrate respective examples of tables managed in the second embodiment;

FIGS. 12A, 12B, 12C and 12D illustrate respective examples of tables managed in the third embodiment;

FIG. 20 illustrates a setting example of a the learning upper limit number;

FIGS. 23A and 23B illustrate respective examples of tables managed in the fifth embodiment;

FIG. 24 is a flowchart illustrating address learning in the fifth embodiment.

DESCRIPTION OF EMBODIMENTS

Figure 1:
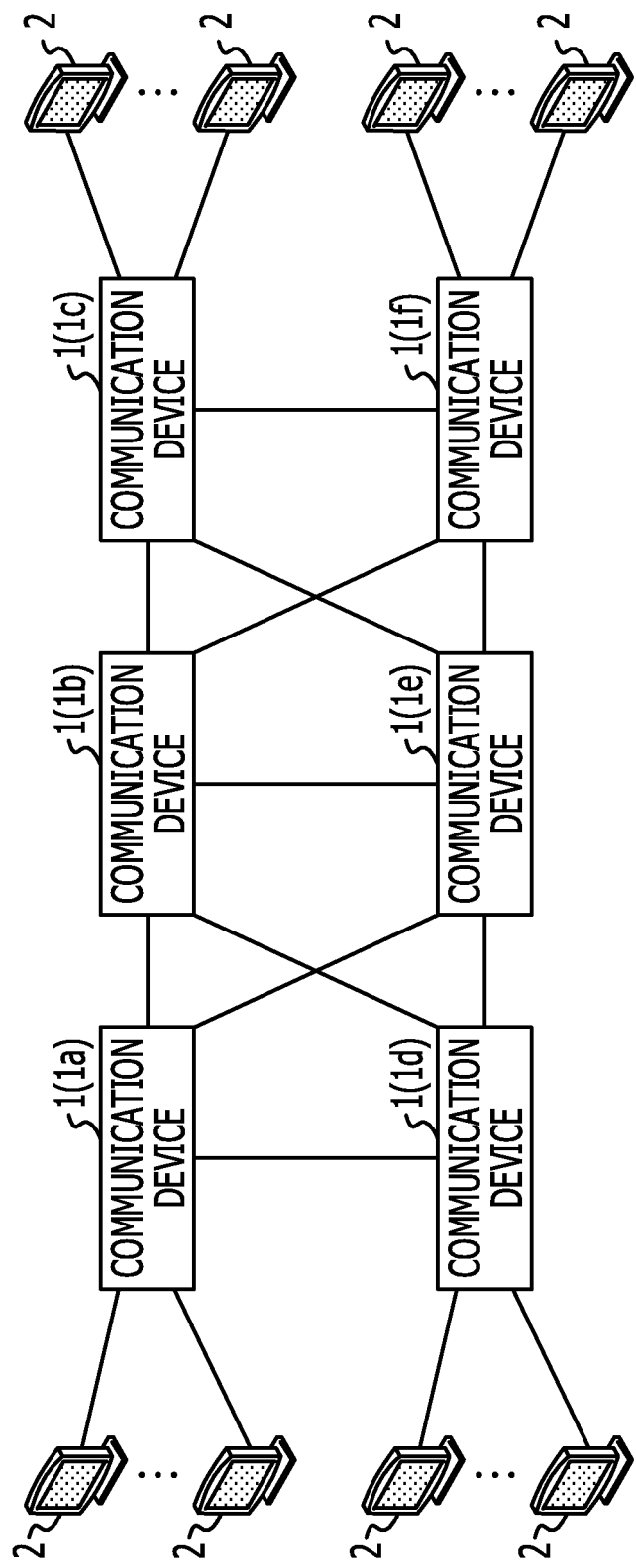
FIG. 1 illustrates one example of a network in which a communication device according to an embodiment is used.

FIG. 1 illustrates one example of a network in which a communication device according to an embodiment is used. As illustrated in FIG. 1, the network includes a plurality of communication devices 1 (1a to 1f). Each communication device 1 is coupled to another one or other plural communication devices 1 via optical fibers, for example. As an example, the communication device is coupled to the communication devices 1b, 1d and 1e. The communication device 1b is coupled to the communication devices 1a, 1c, 1d, 1e and 1f. Each communication device 1 may include one or plural user terminals 2. In the example illustrated in FIG. 1, each of the communication devices 1a, 1c, 1d and 1f includes the plural user terminal 2.

The communication device 1 transfers a frame, received from the user terminal 2 or another communication device 1, to a destination. In other words, the communication device 1 is able to transfer the received frame in accordance with a destination address of the received frame. For example, when an Ethernet frame or an IP frame is transmitted from the user terminal 2, the communication device 1 executes a transfer process of the frame in accordance with a MAC address, an IP address or the like, which is contained in the received frame. It is to be noted that, in this specification, the term "frame" and "packet" are used as being not distinguished from each other. Accordingly, the term "frame" used here involves a packet.

FIG. 2 illustrates one example of configuration of the communication device 1. As illustrated in FIG. 2, the communication device 1 includes a plurality of interface units 11, a switch unit 12, and a control unit 13. A control terminal 14 is coupled to the communication device 1.

Each interface unit 11 has a plurality of ports. In the illustrated embodiment, the communication device 1 has one set of input ports and output ports for one counter device (another communication device 1 or the user terminal 2). In other words, the communication device 1 receives a frame, transmitted from the counter device, via the input port. The communication device 1 transmits a frame to the counter device via the output port.

The interface unit 11 terminates a frame received via the port and sends the received frame to the switch unit 12. The interface unit 11 outputs a frame, introduced from the switch unit 12, via the port corresponding to the destination of the frame. The interface unit 11 is practiced in the form of, for example, a module, board, or card, which is detachable.

The switch unit 12 is coupled to the plural interface units 11. The switch unit 12 introduces a frame, input from one interface unit 11, to another interface unit 11 corresponding to the destination of the input frame. The switch unit 12 includes a processor, a memory, and a hardware circuit for controlling frame transfer. The switch unit 12 is practiced in the form of, for example, a module, board, or card, which is detachable.

The control unit 13 includes a central processing unit (CPU) and a memory, and it controls operations of the interface units 11 and the switch unit 12. The control unit 13 is further able to collect one or both of alarm information and statistical information. The control unit 13 is practiced in the form, for example, a module, board, or card, which is detachable.

The control terminal 14 is a computer coupled to the control unit 13. The control terminal 14 gives an instruction from a user or a network administrator to the communication device 1. The control terminal 14 may be a part of the communication device 1.

The interface units 11, the switch unit 12, and the control unit 13 may not be individually detachable. For example, those units may be of an integral structure using a mother board. The communication device 1 may include other elements in addition to the interface units 11, the switch unit 12, and the control unit 13.

FIGS. 3A and 3B each illustrate one example of a format of a frame transferred by the communication device 1. Herein, the communication device 1 transfers an Ethernet frame. A number put in a parenthesis in FIGS. 3A and 3B represents a bit number.

As illustrated in FIG. 3A, the Ethernet frame includes a destination MAC address (MAC DA), a transmission source MAC address (MAC SA), an Ethernet (registered trademark) type (E-TYPE), a protocol data unit (PDU), and a frame check sequence (FCS). The Ethernet type identifies the type of a message contained in the protocol data unit. As one example, 0x0800 represents an IPv4 frame. The Ethernet type is specified, for example, by the Internet Assigned Numbers Authority (IANA). The protocol data unit contains a message in an upper layer. The frame check sequence is used for detection of frame errors and is implemented as the cyclic redundancy check (CRC) 32 code, for example.

FIG. 3B illustrates a format of an Ethernet frame assigned with a virtual local area network (VLAN) tag. The VLAN tag includes a tag protocol identifier (TPID), priority (Priority), a Drop Eligible Indicator (DEI), and a virtual LAN identifier (VLAN ID). The tag protocol identifier is set to a value representing that the virtual LAN identifier is contained in the frame. For example, 0x8100 specified by IEEE802.1Q is set as the tag protocol identifier. The Priority represents priority of the frame itself. In the example illustrated in FIG. 3B, the Priority has 3 bits and is able to represent 8 classes of priority. The DEI represents priority of discarding. When the network is congested, the frame for which DEI=1 is set is discarded with priority. The virtual LAN identifier is able to identify the user. In some cases, a combination of the tag protocol identifier and the virtual LAN identifier is called the VLAN tag.

First Embodiment

Figure 4:
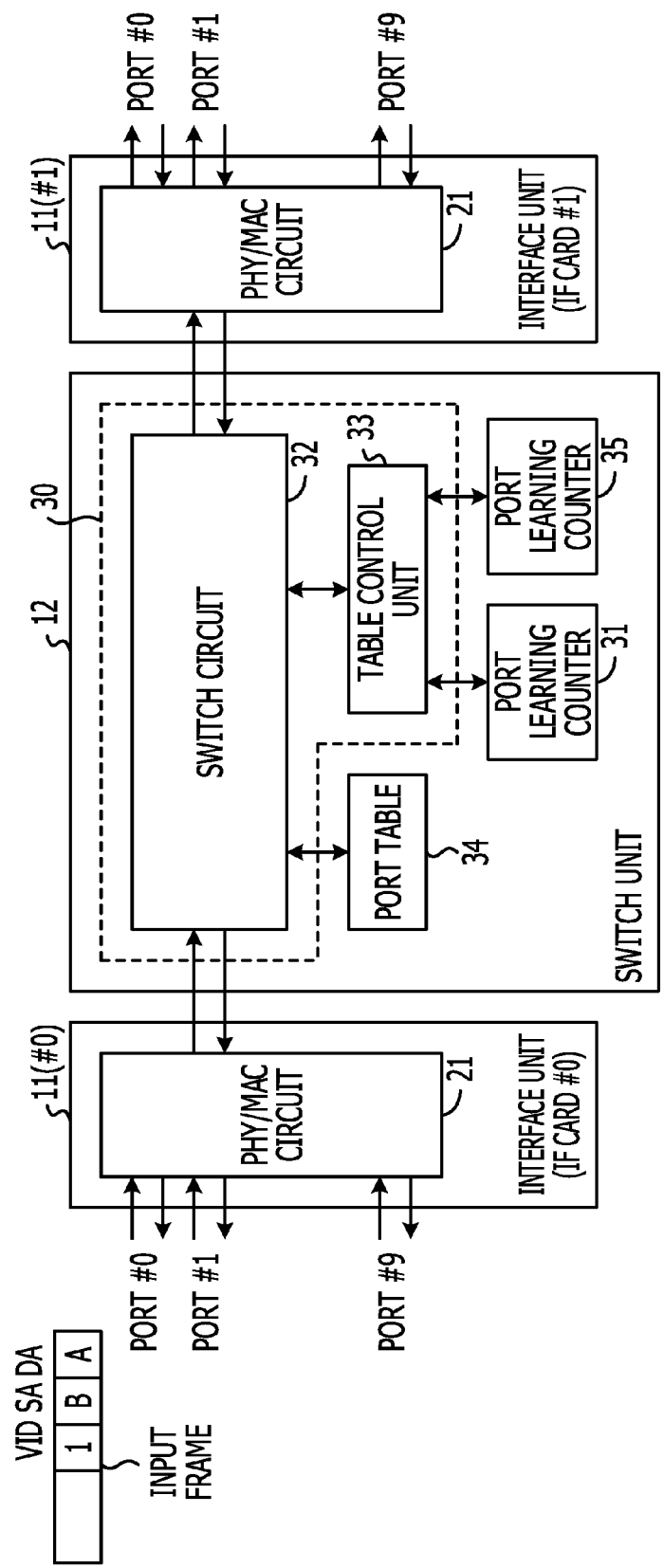
FIG. 4 illustrates one example of configuration of a communication device according to a first embodiment.

FIG. 4 illustrates one example of configuration of a communication device according to a first embodiment. FIG. 4 illustrates only the switch unit 12 and two interface units 11. Each interface unit 11 is practiced in the form of a detachable card and is identified by an interface (IF) card number (#0, #1, and so on).

The interface unit 11 includes a plurality of ports. In the example illustrated in FIG. 4, ten ports are incorporated in each interface unit 11. The individual ports are identified by respective port numbers (#0 to #9).

The interface unit 11 includes a PHY/MAC circuit 21. The PHY/MAC circuit 21 has the function of controlling a physical layer and a MAC layer, and it terminates the Ethernet frame. In other words, the PHY/MAC circuit 21 terminates the frame input from a network via a port and sends the input frame to the switch unit 12. The PHY/MAC circuit 21 further transmits the frame, introduced from the switch unit 12, to the network via a port that is designated by header information.

Figure 5:
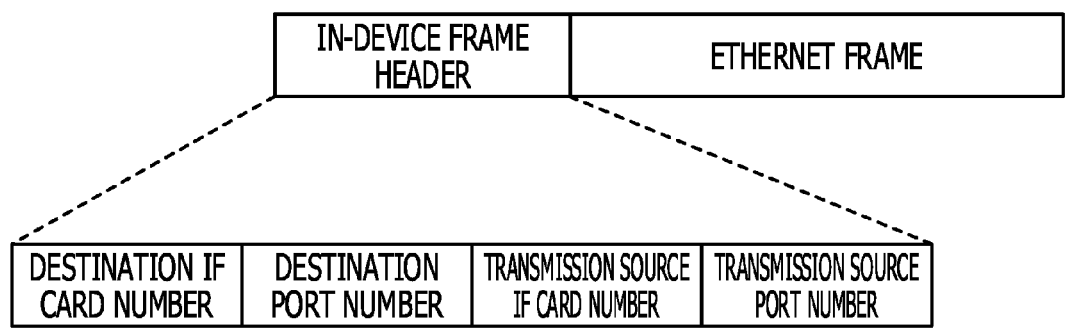
FIG. 5 illustrates one example of a format of a frame transferred in the communication device.

FIG. 5 illustrates one example of a format of a frame transferred in the communication device. In the communication device 1, an in-device frame header is assigned to the Ethernet frame. The in-device frame header includes a destination IF card number, a destination port number, a transmission source IF card number, and a transmission source port number.

The interface unit 11 having received the frame from the network (that interface unit being referred to as an "input IF card" hereinafter) assigns the in-device frame header to the received frame. The transmission source IF card number is set to a card number identifying the input IF card (that is, a card number #0 in the example illustrated in FIG. 4). The transmission source port number is set to a port number identifying the port at which the received frame has arrived (that is, a port number #0 in the example illustrated in FIG. 4). At this point in time, since the destination IF card number and the destination port number are not yet specified, default values, for example, are set in areas corresponding to those numbers.

Though described later, the destination IF card number and the destination port number are specified in the switch unit 12 by referring to the MAC address table. In other words, the destination IF card number and the destination port number are set in the switch unit 12. The destination IF card number identifies the interface unit 11 coupled to the destination of the frame (that interface unit being referred to as an "output IF card" hereinafter). The destination port number identifies the port coupled to the destination of the frame.

Thus, the input IF card assigns the in-device frame header to the received frame and sends it to the switch unit 12. The switch unit 12 searches the MAC address table and acquires the destination IF card number and the destination port number. The switch unit 12 then introduces the relevant frame to the output IF card that is identified by the destination IF card number. Thereafter, the output IF card outputs the relevant frame via the port that is identified by the destination port number. At that time, the PHY/MAC circuit 21 in the output IF card deletes the in-device frame header from the transmitted frame.

The switch unit 12 has the function of transferring the received frame in accordance with the destination MAC address. The switch unit 12 further has the function of learning the MAC address for realizing efficient frame transfer. In order to realize those functions, the switch unit 12 includes a MAC address table 31, a switch circuit 32, a table control unit 33, a port table 34, and a port learning counter 35.

As illustrated in FIG. 6C, the MAC address table 31 stores an effective bit (V), a port identification (ID), an IF card number, a port number, and an aging time with the MAC address being an index. The effective bit represents whether or not a corresponding entry is effective. The IF card number represents the interface unit 11 at the transfer destination of the received frame (namely, it represents the output IF card). The port number represents the port number of the transfer destination of the received frame. The port ID and the aging time will be described later.

The MAC address used as an index may be compressed by a hash operation, for example, to a smaller bit number than an original bit number (for example, 48 bits). The MAC address table 31 may be practiced in the form of a static random access memory (SRAM) or a content addressable memory (CAM), for example. When the MAC address table 31 is practiced in the form of a CAM, a search key based on the MAC address is used as a memory index.

The switch circuit 32 temporarily stores the received frame in a buffer. The switch circuit 32 gives the destination MAC address, the transmission source MAC address, and the in-device frame header of the received frame to the table control unit 33. Then, the table control unit 33 specifies the destination IF card number and the destination port number corresponding to the destination MAC address. The switch circuit 32 receives, from the table control unit 33, the in-device frame header in which the destination IF card number and the destination port number are set. Furthermore, the switch circuit 32 transfers the received frame, stored in the buffer, to the interface unit 11 that is identified by the destination IF card number. The switch circuit 32 is able to access the port table 34, described later, based on the transmission source IF card number and the transmission source port number both contained in the in-device frame header of the received frame.

The table control unit 33 searches the MAC address table 31 using the destination MAC address of the received frame. When the destination MAC address is registered in the MAC address table 31 (namely, when the MAC address is already learned), the table control unit 33 acquires the corresponding destination IF card number and the destination port number. Then, the table control unit 33 sets the destination IF card number and the destination port number, both acquired through the search, in the in-device frame header of the received frame. In such a case, as described above, the switch circuit 32 transfers the received frame to the interface unit 11 that is identified by the destination IF card number.

When the destination MAC address of the received frame is not registered in the MAC address table 31 (namely, when the MAC address is not yet learned), the table control unit 33 notifies the switch circuit 32 of the fact that the MAC address of the received frame is not yet learned. Upon receiving the notification, the switch circuit 32 executes broadcast transfer (that is, flooding) of the received frame to all the ports except for the port at which the received frame has arrived. In the broadcast transfer, the switch circuit 32 copies the received frame and generates a plurality of identical frames.

The table control unit 33 has not only the function of specifying the destination IF card number and the destination port number based on the destination MAC address of the received frame, but also the function of learning the transmission source MAC address of the received frame. The table control unit 33 is one example of a learning control unit for learning the transmission source MAC address of the received frame. In other words, the table control unit 33 has the function of learning the transmission source address of the received frame by registering the transmission source MAC address of the received frame and the corresponding transfer information in the MAC address table 31. The table control unit 33 executes the following processes in the learning of the MAC address.

(1) When the transmission source MAC address of the received frame is not registered in the MAC address table 31 and when there is a blank entry in the MAC address table 31, the table control unit 33 learns the relevant transmission source MAC address. At that time, the transmission source IF card number and the transmission source port number of the received frame are registered as the corresponding transfer information in the MAC address table 31. A previously designated initial value of the aging time is also set.

(2) When the transmission source MAC address of the received frame is already registered in the MAC address table 31 and when the transmission source IF card number and the transmission source port number of the received frame are matched respectively with the transmission source IC card number and the transmission source port number registered in the MAC address table 31, the table control unit 33 updates the aging time in the corresponding entry to an initial value.

(3) When the transmission source MAC address of the received frame is already registered in the MAC address table 31 and when the transmission source IC card number and the transmission source port number of the received frame are different respectively from the transmission source IC card number and the transmission source port number registered in the MAC address table 31, the table control unit 33 updates the transmission source IC card number and the transmission source port number registered in the MAC address table 31. The aging time is updated to an initial value. Such a state may occur, for example, when a terminal device is moved and coupled to a different port.

In the first embodiment, as described later, an upper limit number of addresses allowed to be learned is determined per port ID. Accordingly, in the first embodiment, the learning of the MAC address may not be executed even in the above case (1).

The table control unit 33 executes an aging process of deleting the old MAC address from the MAC address table 31. In more detail, when the MAC address is registered in the MAC address table 31, a predetermined initial value is set as the "aging time" in the corresponding entry. The initial value is, for example, 5 min. The table control unit 33 decrements the aging time in each entry periodically (for example, at intervals of 1 sec). In the entry where the aging time has become zero, the effective bit is rewritten from "1: effective" to "0: ineffective". As a result, the relevant entry becomes a blank entry.

When, before the aging time in some one entry becomes zero, a frame having the transmission source MAC address corresponding to the relevant entry is input to the switch unit 12, the aging time is returned to the initial value (for example, 5 min). Accordingly, during a period in which frames having the same transmission source MAC address repeatedly arrive at the communication device 1, the entry corresponding to the relevant MAC address is not deleted from the MAC address table 31.

The switch circuit 32 and the table control unit 33 are implemented, for example, with a processor system 30. The processor system 30 includes a processor and a memory. In this case, the processor system 30 may provide the address learning function by executing a software program. However, the switch circuit 32 and the table control unit 33 may include a hardware circuit. The switch circuit 32 and the table control unit 33 may be implemented with an application specific integrated circuit (ASIC), a field programmable gate array (FPGA), or the like.

As illustrated in FIG. 6A, the port table 34 stores an effective bit (V), a port ID, a learning upper limit number, an aging time, and frame copy information with a card number and a port number being indexes. The port table 34 is formed in a memory area that is accessible by the switch circuit 32. The port table 34 is one example of a storage unit for storing, per designated group, an upper limit number of addresses allowed to be learned.

The effective bit represents whether or not a corresponding entry is effective. The port ID is ID information used in the communication device 1, and it identifies a logically defined port (hereinafter referred to as a "logical port"). The logical port is created corresponding to one or plural physical ports. In the example illustrated in FIG. 6A, two physical ports (that is, a port #0 of a card #0 and a port #1 of the card #0) are set corresponding to a logical port 1. One physical port (that is, a port #2 of the card #0) is set corresponding to a logical port 2. In the first embodiment, one physical port accommodates only one user. In such a case, the port ID is able to identify the user in fact.

Thus, using the port ID enables a plurality of physical ports to be managed as one logical port. Therefore, the configuration using the port ID is useful in a system having port redundancy as in link aggregation.

The learning upper limit number represents a maximum number of MAC addresses allowed to be registered in the MAC address table 31 (or a maximum number of entries usable for registering the MAC addresses in the MAC address table 31). In the example illustrated in FIG. 6A, "learning upper limit number=100" is set for the logical port 1, and "learning upper limit number=300" is set for the logical port 2. The learning upper limit number is determined, for example, in accordance with the contract between a user corresponding to the logical port and a communications service provider.

The aging time represents a period until a corresponding entry in the MAC address table 31 is deleted. In the example illustrated in FIG. 6A, "aging time=5 min" is set for the logical port 1, and "aging time=3 min" is set for the logical port 2. The aging time is also determined, for example, in accordance with the contract between a user corresponding to the logical port and a communications service provider.

The frame copy information represents destination physical ports to which the received frame is transferred in the case of broadcast transfer (that is, flooding). For example, "C0P0" represents the port #0 of the IF card #0, and "CmPn" represents a port #n of an IF card #m. In the broadcast transfer, the switch circuit 32 transfers the received frame to the ports for which "1" is set.

As illustrated in FIG. 6B, the port learning counter 35 stores a current learning number with the port ID being an index. The term "learning number" represents the number of MAC addresses registered in the MAC address table 31 (or the number of entries used for registering the MAC addresses in the MAC address table 31). Accordingly, when a new MAC address is registered in the MAC address table 31, the learning number is incremented. When the MAC address is deleted from the MAC address table 31 by the aging process, for example, the learning number is decremented.

The operation of the communication device 1 when it receives a frame from a network will be described below. It is here assumed that the frame is input via the port #0 of the interface unit 11, which is identified by the card ID #0. In the following description, the relevant interface unit 11 is also called the "IF card #0" in some cases.

The PHY/MAC circuit 21 of the IF card #0 assigns the in-device frame header to the received frame. The following information is written into the in-device frame header; namely, the transmission source IC card number: #0 and the transmission source port number: #0. The IF card #0 then introduces the received frame, which has been assigned with the in-device frame header, to the switch unit 12. Responsively, the switch unit 12 executes a frame transfer process and an address learning process.

In the frame transfer process, the table control unit 33 searches the MAC address table 31 using a destination MAC address of the received frame. When the search is hit (namely, when the destination MAC address is already learned), the table control unit 33 acquires a destination IC card number and a destination port number, which correspond to the destination MAC address, from the MAC address table 31 illustrated in FIG. 6C. Then, the table control unit 33 stores the acquired destination IC card number and destination port number in the in-device frame header illustrated in FIG. 5. Thereafter, the switch circuit 32 transfers the received frame to the interface unit 11 (herein, the IF card #1) designated by the destination IF card number. The IF card #1 transmits the relevant frame via a physical port that is identified by the destination port number in the in-device frame header.

When the search is not hit (namely, when the MAC address is not yet learned), the switch circuit 32 executes the broadcast transfer of the received frame. In such a case, the switch circuit 32 may transfer the received frame to all the ports other than the port (herein, the port #0 of the IF card #0) at which the received frame has arrived. In the first embodiment, however, the switch circuit 32 transfers the received frame in accordance with the frame copy information stored in the port table 34.

Figure 7:
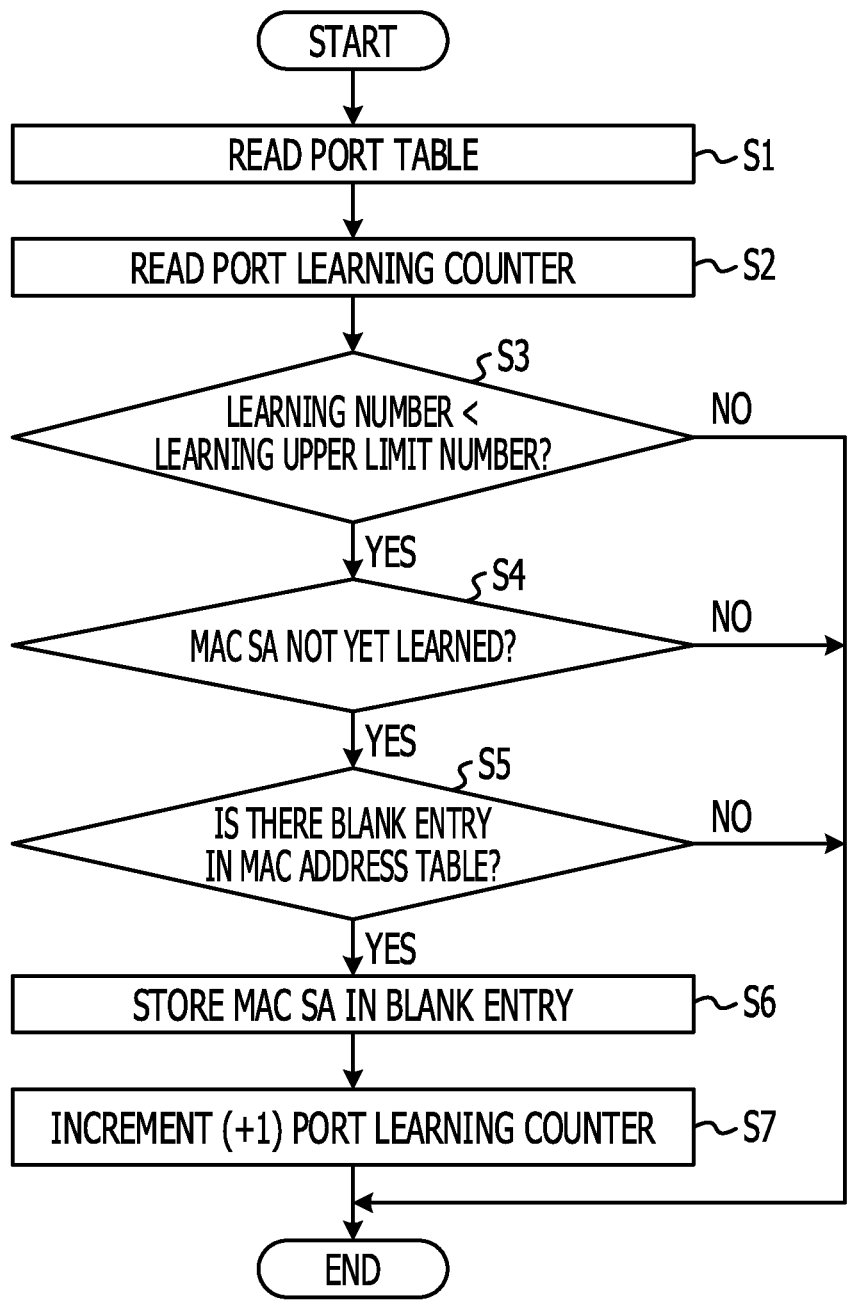
FIG. 7 is a flowchart illustrating address learning in the first embodiment.

FIG. 7 is a flowchart illustrating address learning in the first embodiment. Processing of this flowchart is executed when a frame is input to the switch unit 12.

In S1, the switch circuit 32 reads the port table 34. More specifically, the switch circuit 32 searches the port table 34 using the transmission source IF card number and the transmission source port number, which are contained in the in-device frame header of the received frame. When no corresponding entry is found by the search, or when the effective bit of the corresponding entry is "0", the switch circuit 32 discards the received frame. On the other hand, when the effective bit of the corresponding entry is "1", the switch circuit 32 acquires the port ID, the learning upper limit number, the aging time, and the frame copy information from the relevant entry. The frame copy information is used, as described above, when the broadcast transfer is executed in the frame transfer process.

In S2, the table control unit 33 reads the port learning counter 35. More specifically, the table control unit 33 searches the port learning counter 35 using the port ID, which has been acquired from the port table 34, and acquires the learning number corresponding to the relevant port ID.

In S3, the table control unit 33 compares the learning upper limit number acquired from the port table 34 with the learning number acquired from the port learning counter 35. If the learning number acquired from the port learning counter 35 is smaller than the learning upper limit number, the processing executed by the table control unit 33 is shifted to S4. On the other hand, if the learning number acquired from the port learning counter 35 reaches the learning upper limit number, the table control unit 33 brings the address learning process to an end without accessing the MAC address table 31.

In S4, the table control unit 33 determines whether or not the transmission source MAC address (MAC SA) of the received frame is registered in the MAC address table 31. Stated another way, whether or not the transmission source MAC address of the received frame is already learned is determined. In S5, the table control unit 33 determines whether or not there is a blank entry in the MAC address table 31.

If the transmission source MAC address is not yet learned and there is a blank entry in the MAC address table 31, the table control unit 33 stores the transmission source MAC address in the blank entry of the MAC address table 31 in S6. At that time, the table control unit 33 executes the following processes.

(1) It updates, to "1", the effective bit of the entry where the transmission source MAC address is to be stored.

(2) It stores the port ID acquired from the port table 34 in the relevant entry.

(3) It stores the transmission source IC card number and the transmission source port number, both acquired from the in-device frame header of the received frame, in the relevant entry.

(4) It sets the aging time acquired from the port table 34 in the relevant entry.

In S7, the table control unit 33 accesses the port learning counter 35 using the port ID that has been acquired from the port table 34. Then, the table control unit 33 increments the corresponding learning number in the port learning counter 35.

If the transmission source MAC address of the received frame is registered in the MAC address table 31 (namely, is already learned) (S4: Yes), the table control unit 33 updates the aging time to the initial value. If there is no blank entry in the MAC address table 31 (S5: No), the processing executed by the table control unit 33 is ended.

The port learning counter 35 indicates, per port ID, the number of MAC addresses registered in the MAC address table 31. A counter value represents a current learning number instead of a cumulative learning number. More specifically, when the MAC address belonging to some one port ID is learned, the counter value corresponding to the relevant port ID is incremented by "1". When some one entry of the MAC address table 31 is deleted by the aging process, the counter value corresponding to the port ID, which is stored in the deleted entry, is decremented by "1".

When the table control unit 33 learns the MAC address, it learns the port ID as well. More specifically, the table control unit 33 writes the port ID corresponding to the learned MAC address in the MAC address table 31. Therefore, when some one entry of the MAC address table 31 is deleted by the aging process, the table control unit 33 is able to detect that the entry associated with which port ID has been deleted. Thus, when an entry is deleted by the aging process, the table control unit 33 is able to decrement the learning number of the port ID corresponding to the relevant entry.

In the flowchart illustrated in FIG. 7, the sequence in execution of the above-described processing steps is changeable. For example, one or both of the process of determining whether or not the transmission source MAC address is already learned and the process of determining whether or not there is a blank entry may be executed before comparing the learning number counted by the port learning counter 35 with the learning upper limit number.

In the first embodiment, as described above, the learning upper limit number in the MAC address table 31 is set per port ID. Furthermore, in the first embodiment, one physical port accommodates one user. The corresponding relationship between each physical port and the port ID identifying the logical port is determined in advance. Accordingly, the port ID identifies the user in fact. Stated another way, the learning upper limit number in the MAC address table 31 is set for each user in the first embodiment. Hence many entries of the MAC address table 31 are not occupied by a particular user.

As a result, network resources (herein, entries of the MAC address table 31) are equally allocated to individual users, and flooding caused when the MAC address is not yet learned is suppressed. Congestion of the network is thereby reduced.

In the above-described example, a plurality of physical ports may be set corresponding to one port ID. Therefore, even when one user employs a plurality of physical ports, the learning upper limit number in the MAC address table 31 is managed for each user.

Second Embodiment

Figure 8:
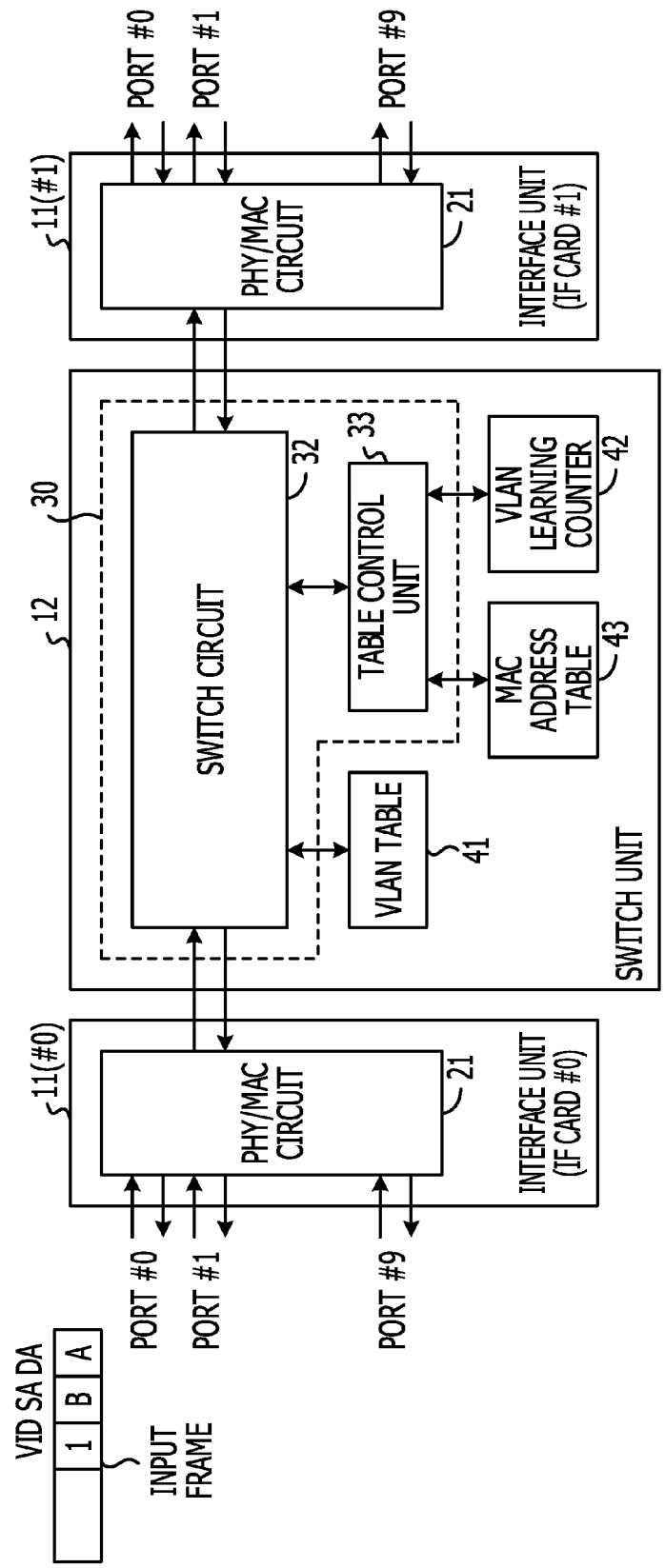
FIG. 8 illustrates one example of configuration of a communication device according to a second embodiment.

FIG. 8 illustrates one example of configuration of a communication device according to a second embodiment. While the learning number of the MAC address is managed per port in the first embodiment, the learning number of the MAC address is managed per VLAN in the second embodiment. To that end, the communication device according to the second embodiment includes a VLAN table 41, a VLAN learning counter 42, and a MAC address table 43 in place of the port table 34, the port learning counter 35, and the MAC address table 31 in the first embodiment, respectively.

As illustrated in FIG. 9A, the VLAN table 41 stores an effective bit (V), a service ID, a learning upper limit number, an aging time, and frame copy information with a virtual ID (VID) being an index. The VLAN table 41 is one example of a storage unit for storing, per designated group, an upper limit number of addresses allowed to be learned.

The VID is contained in a VLAN tag of each frame as illustrated in FIG. 3B, and it identifies a virtual LAN. Accordingly, the switch unit 12 is able to access the VLAN table 41 using the VID of the received frame. In FIG. 3B, "VID" is denoted as "VLAN ID".

The index of the VLAN table 41 may be constituted corresponding to VIDs of plural stages of VLAN tags. For example, when the VLAN table 41 is formed as a static random access memory (SRAM) or a dynamic random access memory (DRAM), a VID of the first stage and a VID of the second stage may be used as a table index. When the VLAN table 41 is implemented using a content addressable memory, the VID of the first stage and the VID of the second stage may be used as a search key for the content addressable memory.

The service ID is an identification information used in the communication device, and it identifies service provided to the user. In other words, the service ID identifies the user in fact. Furthermore, a desired service ID may be assigned to each VID. In an example illustrated in FIG. 9A, two virtual LANs (VID #0 and VID #1) are set corresponding to service 1. One virtual LAN (VID #2) is set corresponding to service 2.

The learning upper limit number is set per service ID in the second embodiment. In other words, the learning upper limit number in the MAC address table 43 is set for each user. In the example illustrated in FIG. 9A, "learning upper limit number=100" is set for the service 1, and "learning upper limit number=300" is set for the service 2. The learning upper limit number is determined, for example, in accordance with the contract between a user corresponding to the service ID and a communications service provider.

The aging time is set per service ID in the second embodiment. The frame copy information is set per VID.

As illustrated in FIG. 9B, the VLAN learning counter 42 stores a current learning number with the service ID being an index. As in the first embodiment, when a MAC address is newly learned, the learning number is incremented. When the MAC address is deleted by the aging process, the learning number is decremented.

The MAC address table 43 has substantially the same structure in the first and second embodiments. In the MAC address table 43 in the second embodiment, however, the service ID is managed instead of the port ID in the first embodiment, as illustrated in FIG. 9C.

Figure 10:
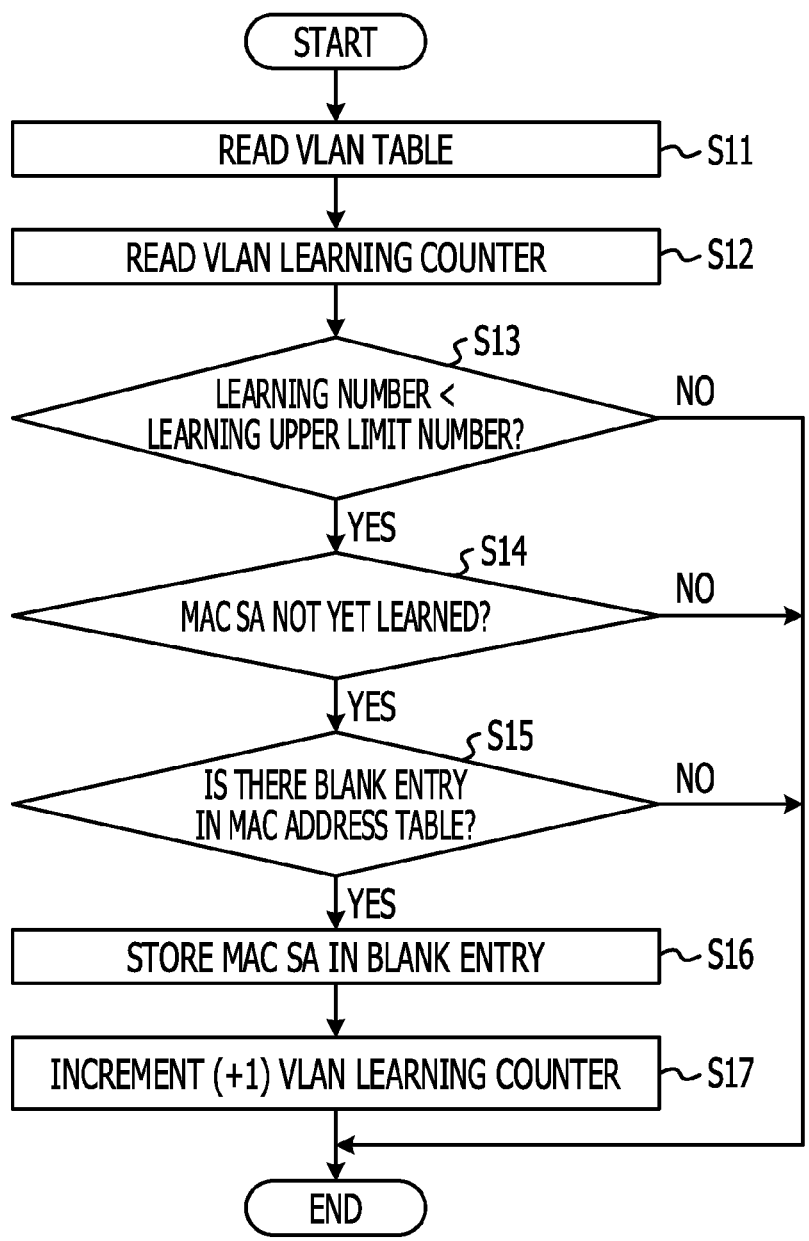
FIG. 10 is a flowchart illustrating address learning in the second embodiment.

FIG. 10 is a flowchart illustrating address learning in the second embodiment. Processing of this flowchart is executed when a frame is input to the switch unit 12.

In S11, the switch circuit 32 reads the VLAN table 41. More specifically, the switch circuit 32 searches the VLAN table 41 using the VID of the received frame. When no corresponding entry is found by the search, or when the effective bit of the corresponding entry is "0", the switch circuit 32 discards the received frame. On the other hand, when the effective bit of the corresponding entry is "1", the switch circuit 32 acquires the service ID, the learning upper limit number, the aging time, and the frame copy information from the relevant entry.

In S12, the table control unit 33 reads the VLAN learning counter 42. More specifically, the table control unit 33 searches the VLAN learning counter 42 using the service ID, which has been acquired from the VLAN table 41, and acquires the current learning number corresponding to the relevant service ID.

In S13, the table control unit 33 compares the learning upper limit number acquired from the VLAN table 41 with the learning number acquired from the VLAN learning counter 42. If the learning number acquired from the VLAN learning counter 42 is smaller than the learning upper limit number, the processing executed by the table control unit 33 is shifted to S14. On the other hand, if the learning number acquired from the VLAN learning counter 42 reaches the learning upper limit number, the table control unit 33 brings the address learning process to an end without accessing the MAC address table 43.

Processes in S14 and S15 are substantially the same as those in S4 and S5 in FIG. 7, respectively. More specifically, the table control unit 33 determines whether or not the transmission source MAC address (MAC SA) of the received frame is already learned. Then, the table control unit 33 determines whether or not there is a blank entry in the MAC address table 43.

If the transmission source MAC address is not yet learned and there is a blank entry in the MAC address table 43, the table control unit 33 stores the transmission source MAC address in the blank entry of the MAC address table 43 in S16. At that time, the table control unit 33 executes the following processes.

(1) It updates, to "1", the effective bit of the entry where the transmission source MAC address is to be stored.

(2) It stores the service ID acquired from the VLAN table 41 in the relevant entry.

(3) It stores the transmission source IC card number and the transmission source port number, both acquired from the in-device frame header of the received frame, in the relevant entry.

(4) It sets the aging time acquired from the VLAN table 41 in the relevant entry.

In S17, the table control unit 33 accesses the VLAN learning counter 42 using the service ID that has been acquired from the VLAN table 41. Then, the table control unit 33 increments the corresponding learning number in the VLAN learning counter 42.

If the transmission source MAC address of the received frame is registered in the MAC address table 43 (namely, is already learned) (S14: Yes), the table control unit 33 updates the aging time to the initial value. If there is no blank entry in the MAC address table 43 (S15: No), the processing executed by the table control unit 33 is ended.

The VLAN learning counter 42 indicates, per service ID, the number of MAC addresses registered in the MAC address table 43. More specifically, when the MAC address belonging to some one service ID is learned, the counter value corresponding to the relevant service ID is incremented by "1". When some one entry of the MAC address table 43 is deleted by the aging process, the counter value corresponding to the service ID, which is stored in the deleted entry, is decremented by "1".

When the table control unit 33 learns the MAC address, it learns the service ID as well. Therefore, when some one entry of the MAC address table 43 is deleted by the aging process, the table control unit 33 is able to detect that the entry associated with which service ID has been deleted. Thus, when an entry is deleted by the aging process, the table control unit 33 is able to decrement the learning number of the service ID corresponding to the relevant entry.

In the flowchart illustrated in FIG. 10, the sequence in execution of the above-mentioned processing steps is changeable. For example, one or both of the process of determining whether or not the transmission source MAC address is already learned and the process of determining whether or not there is a blank entry may be executed before comparing the learning number counted by the VLAN learning counter 42 with the learning upper limit number.

In the second embodiment, as described above, the learning upper limit number for the MAC address is set for each user of the virtual LAN. Accordingly, also in the second embodiment, many entries of the MAC address table 43 are not occupied by a particular user. As a result, congestion of the network is reduced.

The second embodiment enables a plurality of virtual LANs to be set corresponding to one service ID. Therefore, even when one user employs a plurality of virtual LANs, it is possible to manage an upper limit of the address learning number allowed for the relevant user. One learning upper limit number may be set for a plurality of virtual LANs to which the best effort (low priority) service is applied.

Third Embodiment

In the first embodiment, one learning upper limit number is given for each port. In the second embodiment, one learning upper limit number is given for each service ID (or each virtual LAN). On the other hand, in a third embodiment, a plurality of learning upper limit numbers is given for each service ID (or each VLAN).

Figure 11:
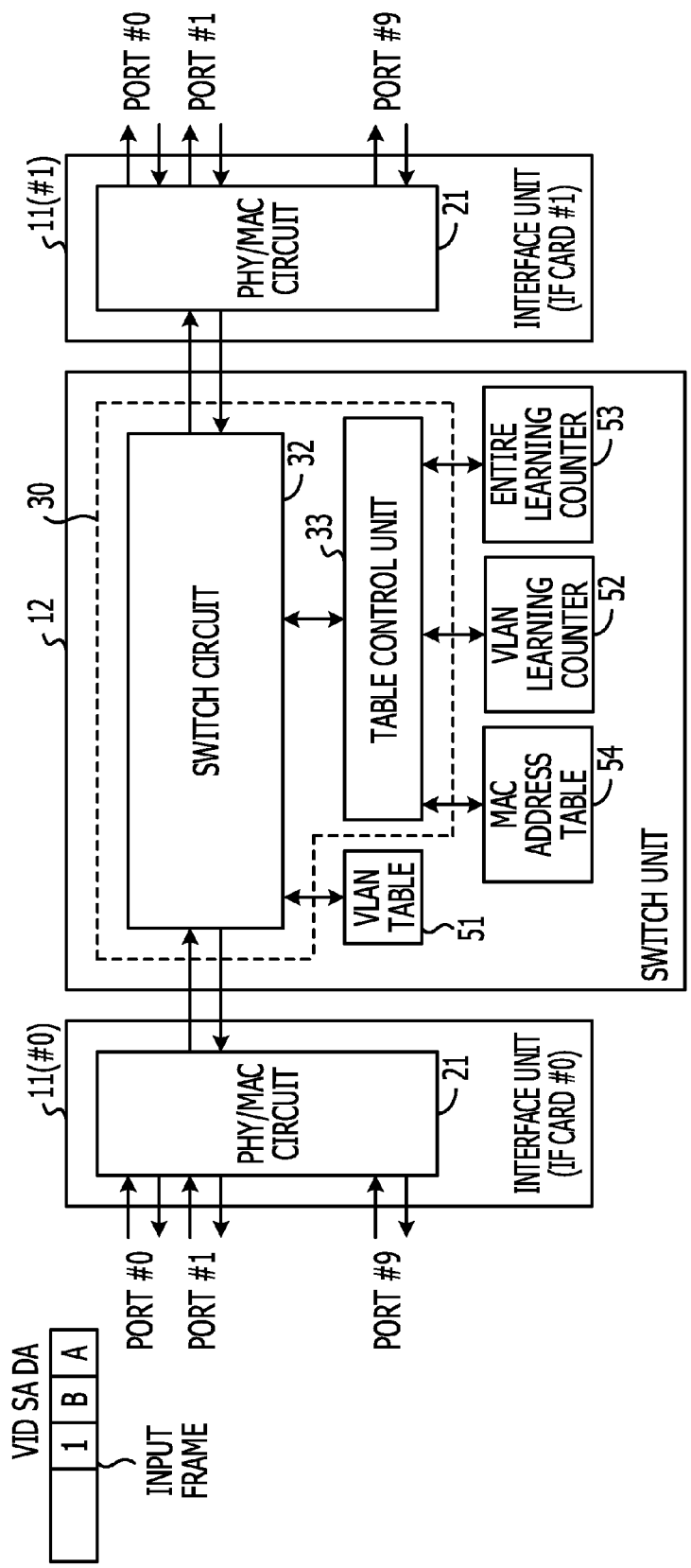
FIG. 11 illustrates one example of configuration of a communication device according to a third embodiment.

FIG. 11 illustrates one example of configuration of a communication device according to the third embodiment. In the third embodiment, a switch unit 12 includes a switch circuit 32, a table control unit 33, a VLAN table 51, a VLAN learning counter 52, an entire learning counter 53, and a MAC address table 54.

As illustrated in FIG. 12A, the VLAN table 51 stores an effective bit (V), a service ID, a learning upper limit number, and an aging time with a VID being an index. The VLAN table 51 is one example of a storage unit for storing, per designated group, an upper limit number of addresses allowed to be learned. The VLAN table 51 also stores frame copy information as in the VLAN table 41 in the second embodiment. However, because the frame copy information is the same in the second and third embodiments, the frame copy information is omitted from the drawing.

In the third embodiment, learning priority is defined. Three learning priorities (high priority, medium priority, and low priority) are prepared in the third embodiment. The learning priority is different from the above-mentioned priority (Priority) assigned to the frame. The number of learning priorities provided by the communication device is not limited to 3, and it may be set to a desired number (for example, 4 or 8).

The learning upper limit number is set per service ID as in the second embodiment. In the third embodiment, however, the learning upper limit number is set per learning priority. In an example illustrated in FIG. 12A, for service 1 (VID #0), the upper limit numbers of MAC addresses allowed to be learned with the high priority, the medium priority, and the low priority are set respectively to 400, 300 and 100, for example. For service 2 (VID #1), the upper limit numbers of MAC addresses allowed to be learned with the high priority, the medium priority, and the low priority are set respectively to 500, 400 and 100, for example.

The aging time is also set per service ID as in the second embodiment. In the third embodiment, however, the aging time is set per learning priority. In the example illustrated in FIG. 12A, for the service 1 (VID #0), the aging times of the MAC addresses having been learned with the high priority, the medium priority, and the low priority are set respectively to 5 min, 3 min and 1 min, for example. For the service 2 (VID #1), the aging times of the MAC addresses having been learned with the high priority, the medium priority, and the low priority are set respectively to 5 min, 5 min and 5 min, for example.

As illustrated in FIG. 12B, the VLAN learning counter 52 counts a current learning number with the service ID being an index. In the third embodiment, the learning number is managed for each learning priority. Stated in another way, the number of MAC addresses registered in the MAC address table 54 is managed by the VLAN learning counter 52 for each service ID and for each learning priority.

As illustrated in FIG. 12C, the entire learning counter 53 manages a total learning number for each learning priority. Stated in another way, the total number of MAC addresses registered in the MAC address table 54 is managed by the total learning counter 53 for each learning priority. The total learning counter 53 has one entry.

As illustrated in FIG. 12D, the MAC address table 54 stores, for each entry, learning priority in addition to an effective bit (V), a service ID, an IF card number, a port number, and an aging time. The learning priority stored in the MAC address table 54 represents with which priority the MAC address has been learned. For example, when the transmission source MAC address of some one received frame has been learned with the high priority, "learning priority=high" is written in the entry corresponding to the relevant MC address.

Figure 13:
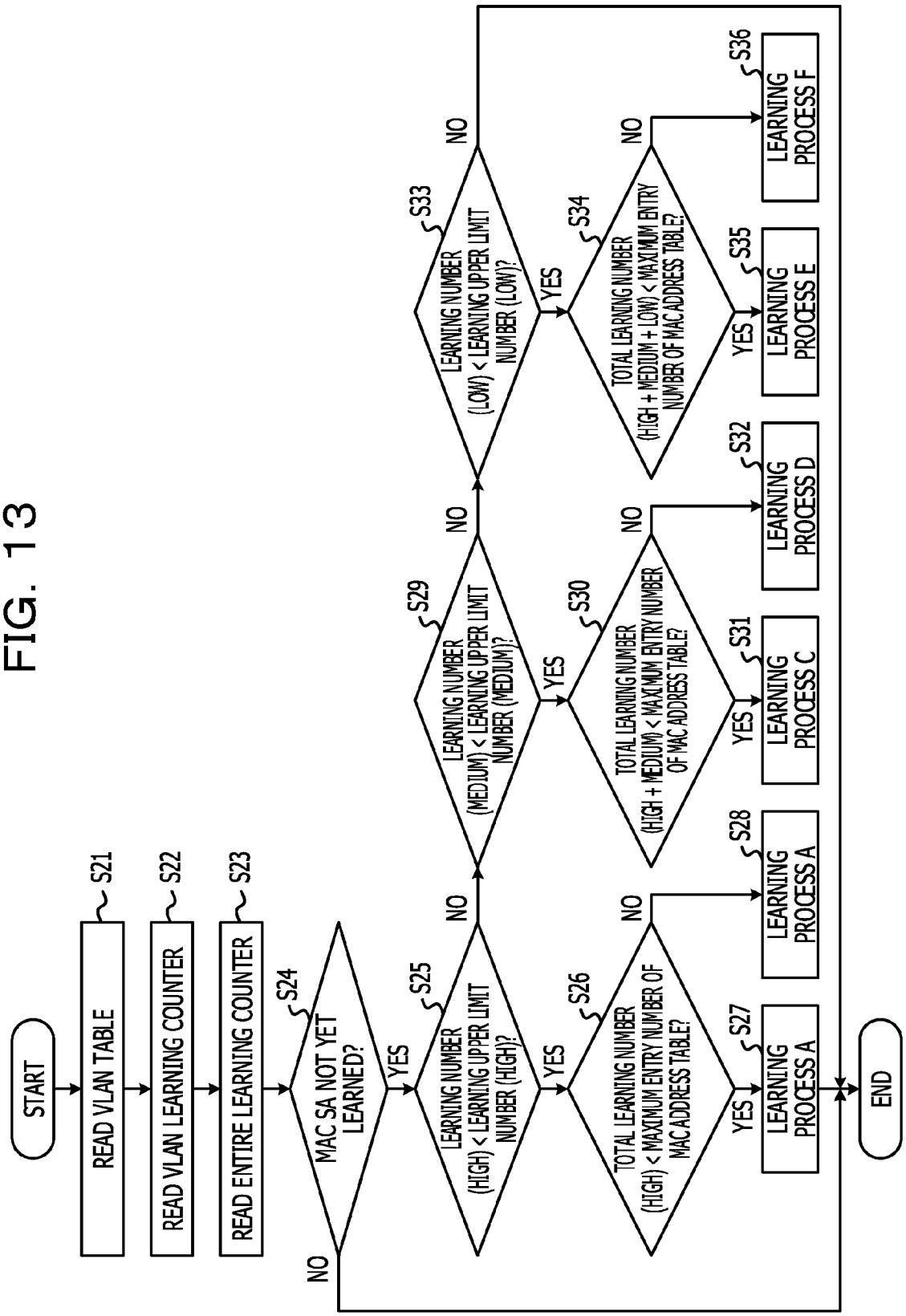
FIG. 13 is a flowchart illustrating address learning in the third embodiment.

FIG. 13 is a flowchart illustrating address learning in the third embodiment. Processing of this flowchart is executed when a frame is input to the switch unit 12.

In S21, the switch circuit 32 reads the VLAN table 51 illustrated in FIG. 12A. More specifically, the switch circuit 32 searches the VLAN table 51 using the VID of the received frame, and acquires the service ID, the learning upper limit number, the aging time, and the frame copy information, which correspond to the VID of the received frame. With that search, the switch circuit 32 acquires, for the VID of the received frame, the upper limit number of MAC addresses allowed to be learned with the high priority (hereinafter referred to as the "learning upper limit number (high)"), the upper limit number of MAC addresses allowed to be learned with the medium priority (hereinafter referred to as the "learning upper limit number (medium)"), and the upper limit number of MAC addresses allowed to be learned with the low priority (hereinafter referred to as the "learning upper limit number (low)").

In S22, the table control unit 33 reads the VLAN learning counter 52. More specifically, the table control unit 33 searches the VLAN learning counter 52 using the service ID, which has been acquired from the VLAN table 51, and acquires the learning number corresponding to the relevant service ID. With that search, the switch circuit 32 acquires, for the VID of the received frame, the number of MAC addresses already learned with the high priority (hereinafter referred to as the "learning number (high)"), the number of MAC addresses already learned with the medium priority (hereinafter referred to as the "learning number (medium)"), and the number of MAC addresses already learned with the low priority (hereinafter referred to as the "learning number (low)").

In S23, the table control unit 33 reads the entire learning counter 53. More specifically, the table control unit 33 acquires the total learning number for each learning priority from the entire learning counter 53. With that search, the switch circuit 32 acquires the total number of MAC addresses already learned with the high priority (hereinafter referred to as the "total learning number (high)"), the total number of MAC addresses already learned with the medium priority (hereinafter referred to as the "total learning number (medium)"), and the total number of MAC addresses already learned with the low priority (hereinafter referred to as the "total learning number (low)").

In S24, the table control unit 33 determines whether or not the transmission source MAC address (MAC SA) of the received frame is registered in the MAC address table 54. Stated in another way, the table control unit 33 determines whether or not the transmission source MAC address of the received frame is already learned. If the transmission source MAC address is not yet learned, the processing executed by the table control unit 33 is shifted to S25. On the other hand, if the transmission source MAC address is already learned, the table control unit 33 updates the aging time to the initial value and brings the processing to an end without executing S25 to S36.

S25, S29, and S33 are prepared to determine with which learning priority the MAC address is to be learned.

In S25, the table control unit 33 compares the learning upper limit number (high) acquired from the VLAN table 51 with the learning number (high) acquired from the VLAN learning counter 52. If the learning number (high) is smaller than the learning upper limit number (high), the processing executed by the table control unit 33 is shifted to S26. On the other hand, if the learning number (high) reaches the learning upper limit number (high), the processing executed by the table control unit 33 is shifted to S29.

In S29, the table control unit 33 compares the learning number (medium) with the learning upper limit number (medium). If the learning number (medium) is smaller than the learning upper limit number (medium), the processing executed by the table control unit 33 is shifted to S30. On the other hand, if the learning number (medium) reaches the learning upper limit number (medium), the processing executed by the table control unit 33 is shifted to S33.

In S33, the table control unit 33 compares the learning number (low) with the learning upper limit number (low). If the learning number (low) is smaller than the learning upper limit number (low), the processing executed by the table control unit 33 is shifted to S34. On the other hand, if the learning number (low) reaches the learning upper limit number (low), the processing executed by the table control unit 33 is ended.

In S26 to S28, the transmission source MAC address of the received frame is learned with the high priority. More specifically, in S26, the table control unit 33 compares the total learning number (high) acquired from the entire learning counter 53 with a maximum entry number of the MAC address table 54. If the total learning number (high) is smaller than the maximum entry number, the table control unit 33 executes a learning process A in S27. On the other hand, if the total learning number (high) reaches the maximum entry number, the table control unit 33 executes a learning process B in S28.

Figure 14:
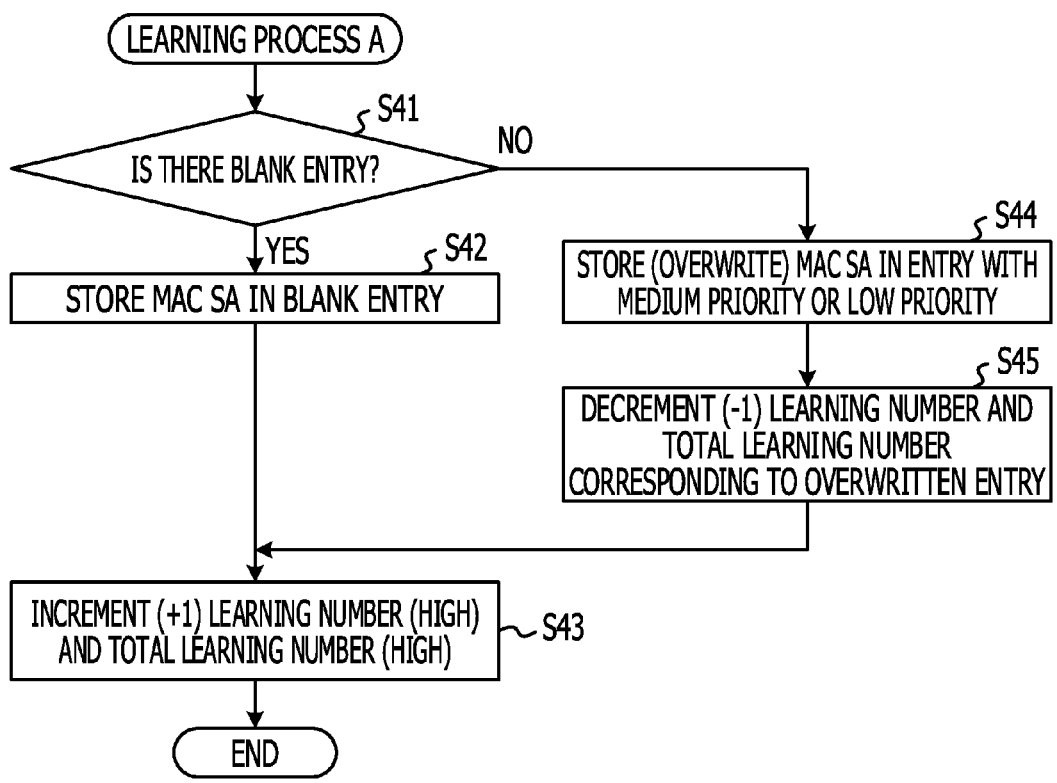
FIG. 14 is a flowchart illustrating a learning process A in FIG. 13.

FIG. 14 is a flowchart illustrating the learning process A in FIG. 13. The learning process A is executed to learn the transmission source MAC address of the received frame with the high priority when the following conditions are satisfied.

(1) The learning number (high) is smaller than the learning upper limit number (high) for the service ID corresponding to the received frame.

(2) The total learning number (high) is smaller than the maximum entry number of the MAC address table 54.

In S41, the table control unit 33 determines whether or not there is a blank entry in the MAC address table 54. If there is a blank entry, the table control unit 33 stores the transmission source MAC address of the received frame in the blank entry in S42. Here, "storing the MAC address in the MAC address table 54" implies a process of storing, as illustrated in FIG. 12D, the service ID, the learning priority, the IF card number, the port number, and the aging time in the entry that is determined using the MAC address as an index. At that time, "learning priority=high" is set in the relevant entry. The IF card number and the port number, both stored in the MAC address table 54, are one example of transfer information used for controlling the frame transfer.

In S43, the table control unit 33 increments the learning number (high) corresponding to the service ID of the received frame in the VLAN learning counter 52. Furthermore, the table control unit 33 increments the total learning number (high) in the entire learning counter 53.

If there is no blank entry in the MAC address table 54 (S41: No), the table control unit 33 selects, in S44, one entry where the MAC address is stored with the medium priority or the low priority and stores the transmission source MAC address of the received frame in the selected entry. At that time, "learning priority=high" is set in the relevant entry. The selected entry is overwritten with the transmission source MAC address of the received frame. The table control unit 33 selects, for example, the oldest entry (or an entry older than a predetermined threshold) from among the entries where the MAC addresses are stored with the medium priority or the low priority. Preferably, the table control unit 33 selects one entry where the MAC address is stored with the low priority.

In S45, the table control unit 33 decrements each of the learning number and the total learning number corresponding to the entry that has been overwritten in S44. For example, when "service ID=#2" and "learning priority=low" were stored in the entry that has been overwritten in S44, the learning number (low) corresponding to the service ID=#2 is decremented in the VLAN learning counter 52, and the total learning number (low) is decremented in the entire learning counter 53.

Figure 15:
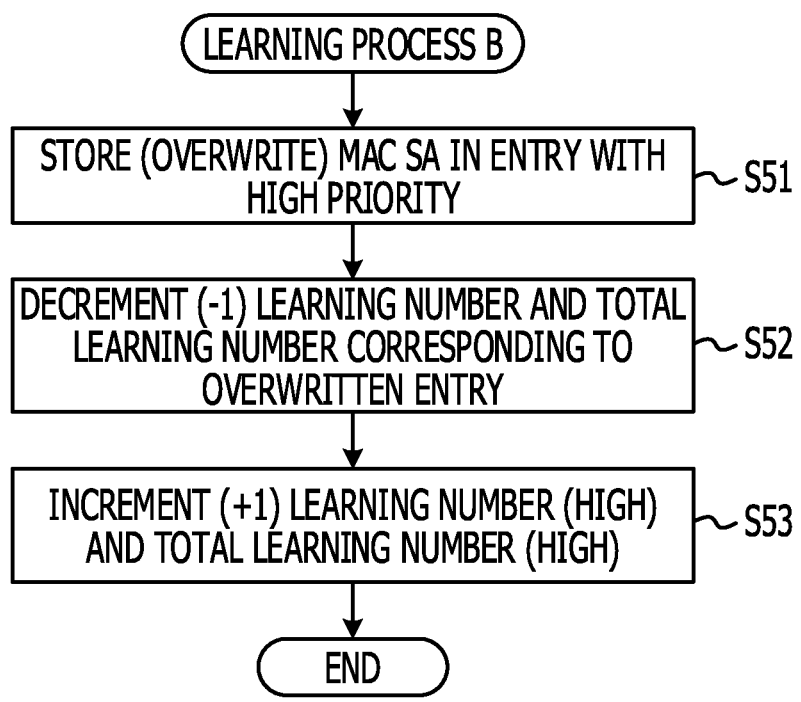
FIG. 15 is a flowchart illustrating a learning process B in FIG. 13.

FIG. 15 is a flowchart illustrating the learning process B in FIG. 13. The learning process B is executed to learn the transmission source MAC address of the received frame with the high priority when the following conditions are satisfied.

(1) The learning number (high) is smaller than the learning upper limit number (high) for the service ID corresponding to the received frame.

(2) The total learning number (high) reaches the maximum entry number of the MAC address table 54.

In S51, the table control unit 33 selects one entry where the MAC address is stored with the high priority and stores the transmission source MAC address of the received frame in the selected entry. At that time, "learning priority=high" is set in the relevant entry. The selected entry is overwritten with the transmission source MAC address of the received frame. The table control unit 33 selects, for example, the oldest entry (or an entry older than a predetermined threshold) from among the entries where the MAC addresses are stored with the high priority.

In S52, the table control unit 33 decrements each of the learning number and the total learning number corresponding to the entry that has been overwritten in S51. For example, when "service ID=#1" was stored in the entry that has been overwritten in S51, the learning number (high) corresponding to the service ID=#1 is decremented in the VLAN learning counter 52, and the total learning number (high) is decremented in the entire learning counter 53.

In S53, the table control unit 33 increments, in the VLAN learning counter 52, the learning number (high) corresponding to the service ID of the received frame. Furthermore, the table control unit 33 increments the total learning number (high) in the entire learning counter 53.

Returning to FIG. 13, the transmission source MAC address of the received frame is learned with the medium priority in S30 to S32. In S30, the table control unit 33 compares the sum of the total learning number (high) and the total learning number (medium), both acquired from the entire learning counter 53, with the maximum entry number of the MAC address table 54. Hereinafter, the sum of the total learning number (high) and the total learning number (medium), both acquired from the entire learning counter 53, is also denoted as a "total learning number (high+medium)". If the total learning number (high+medium) is smaller than the maximum entry number, the table control unit 33 executes a learning process C in S31. On the other hand, if the total learning number (high+medium) reaches the maximum entry number, the table control unit 33 executes a learning process D in S32.

Figure 16:
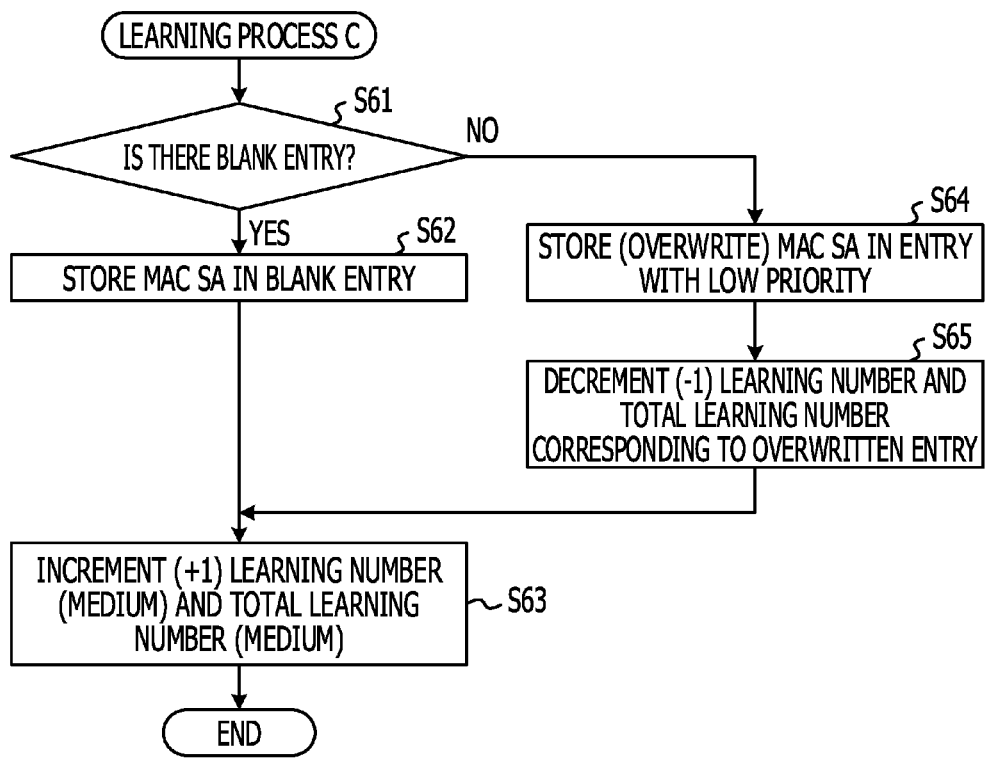
FIG. 16 is a flowchart illustrating a learning process C in FIG. 13.

FIG. 16 is a flowchart illustrating the learning process C in FIG. 13. The learning process C is executed to learn the transmission source MAC address of the received frame with the medium priority when the following conditions are satisfied.

(1) The learning number (high) reaches the learning upper limit number (high) for the service ID corresponding to the received frame.

(2) The learning number (medium) is smaller than the learning upper limit number (medium) for the service ID corresponding to the received frame.

(3) The total learning number (high+medium) is smaller than the maximum entry number of the MAC address table 54.

S61 to S65 in the learning process C are similar to S41 to S45 in the learning process A illustrated in FIG. 14, respectively. In the learning process C, however, the transmission source MAC address of the received frame is learned with the medium priority. Accordingly, the learning process C is different from the learning process A in the following points.

When the transmission source MAC address of the received frame is stored in S62, "learning priority=medium" is set. In S63, the table control unit 33 increments, in the VLAN learning counter 52, the learning number (medium) corresponding to the service ID of the received frame and further increments the total learning number (medium) in the entire learning counter 53. In S64, the table control unit 33 selects one entry where the MAC address is stored with the low priority, and stores the transmission source MAC address of the received frame in the selected entry. Moreover, "learning priority=medium" is set in S64.

Figure 17:
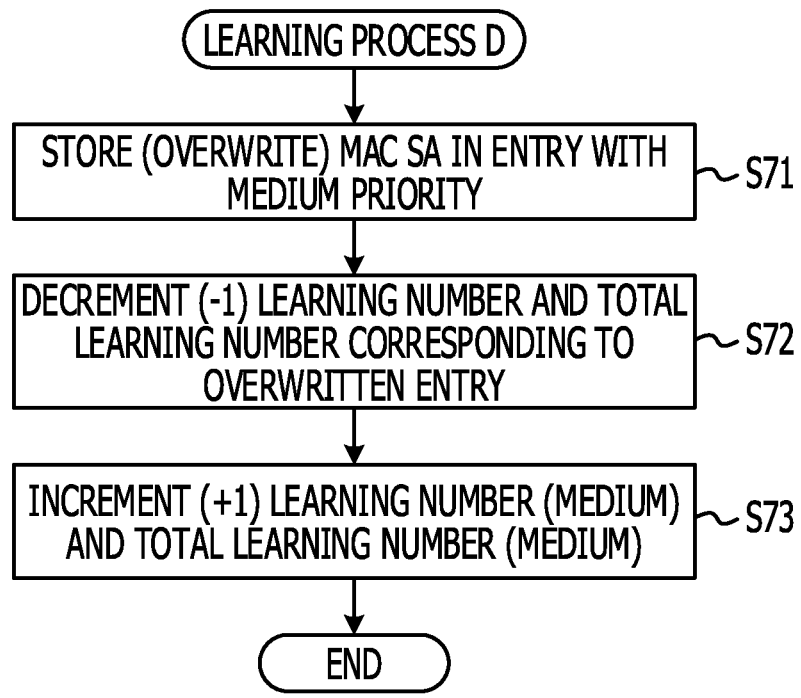
FIG. 17 is a flowchart illustrating a learning process D in FIG. 13.

FIG. 17 is a flowchart illustrating the learning process D in FIG. 13. The learning process D is executed to learn the transmission source MAC address of the received frame with the medium priority when the following conditions are satisfied.

(1) The learning number (high) reaches the learning upper limit number (high) for the service ID corresponding to the received frame.

(2) The learning number (medium) is smaller than the learning upper limit number (medium) for the service ID corresponding to the received frame.

(3) The total learning number (high+medium) reaches the maximum entry number of the MAC address table 54.

S71 to S73 in the learning process D are similar to S51 to S53 in the learning process B illustrated in FIG. 15, respectively. In the learning process D, however, the transmission source MAC address of the received frame is learned with the medium priority. Accordingly, the learning process D is different from the learning process B in the following points.

In S71, the table control unit 33 selects one entry where the MAC address is stored with the medium priority, and stores the transmission source MAC address of the received frame in the selected entry. At that time, "learning priority=medium" is set for the entry selected for a new MAC address. In S73, the table control unit 33 increments, in the VLAN learning counter 52, the learning number (medium) corresponding to the service ID of the received frame and further increments the total learning number (medium) in the entire learning counter 53.

Returning to FIG. 13, the transmission source MAC address of the received frame is learned with the low priority in S34 to S36. In S34, the table control unit 33 compares the sum of the total learning number (high), the total learning number (medium), and the total learning number (low), all acquired from the entire learning counter 53, with the maximum entry number of the MAC address table 54. Hereinafter, the sum of the total learning number (high), the total learning number (medium), and the total learning number (low), all acquired from the entire learning counter 53, is also denoted as a "total learning number (high+medium+low)". If the total learning number (high+medium+low) is smaller than the maximum entry number, the table control unit 33 executes a learning process E in S35. On the other hand, if the total learning number (high+medium+low) reaches the maximum entry number, the table control unit 33 executes a learning process F in S36.

Figure 18:
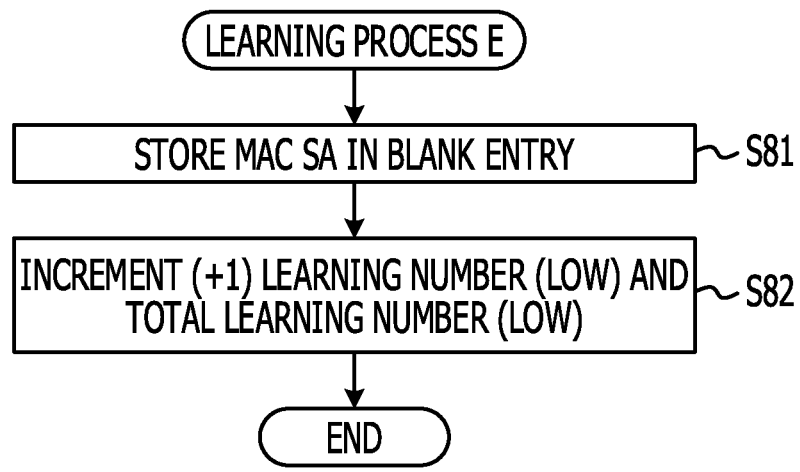
FIG. 18 is a flowchart illustrating a learning process E in FIG. 13.

FIG. 18 is a flowchart illustrating the learning process E in FIG. 13. The learning process E is executed to learn the transmission source MAC address of the received frame with the low priority when the following conditions are satisfied.

(1) The learning number (high) reaches the learning upper limit number (high) for the service ID corresponding to the received frame.

(2) The learning number (medium) reaches the learning upper limit number (medium) for the service ID corresponding to the received frame.

(3) The learning number (low) is smaller than the learning upper limit number (low) for the service ID corresponding to the received frame.

(4) The total learning number (high+medium+low) is smaller than the maximum entry number of the MAC address table 54.

S81 and S82 in the learning process E are similar to S42 and S43 in the learning process A illustrated in FIG. 14, respectively. In the learning process E, however, the transmission source MAC address of the received frame is learned with the low priority. Accordingly, S81 and S82 in the learning process E are different from S42 and S43 in the learning process A in the following points.

When the transmission source MAC address of the received frame is stored in S81, "learning priority=low" is set in the corresponding entry. In S82, the table control unit 33 increments, in the VLAN learning counter 52, the learning number (low) corresponding to the service ID of the received frame and further increments the total learning number (low) in the entire learning counter 53.

Figure 19:
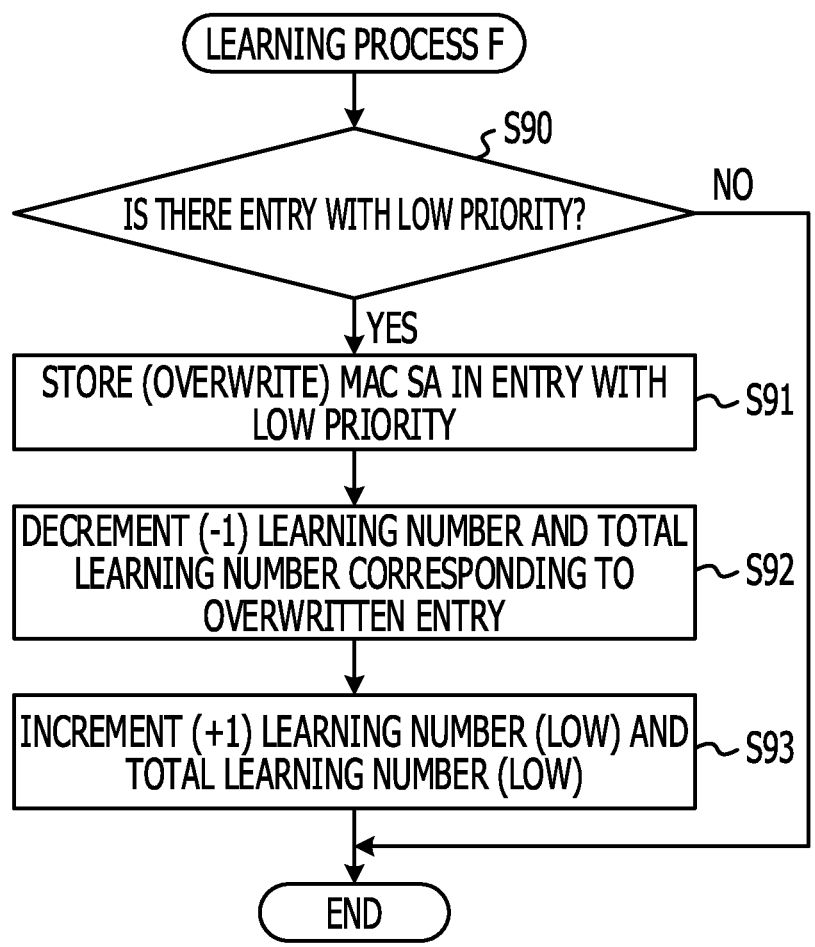
FIG. 19 is a flowchart illustrating a learning process F in FIG. 13.

FIG. 19 is a flowchart illustrating the learning process F in FIG. 13. The learning process F is executed to learn the transmission source MAC address of the received frame with the low priority when the following conditions are satisfied.

(1) The learning number (high) reaches the learning upper limit number (high) for the service ID corresponding to the received frame.

(2) The learning number (medium) reaches the learning upper limit number (medium) for the service ID corresponding to the received frame.

(3) The learning number (low) is smaller than the learning upper limit number (low) for the service ID corresponding to the received frame.

(4) The total learning number (high+medium+low) reaches the maximum entry number of the MAC address table 54.

In S90, the table control unit 33 determines whether or not there is an entry where the MAC address is stored with the low priority. If there is an entry where the MAC address is stored with the low priority, the processing executed by the table control unit 33 is shifted to S91. On the other hand, if all entries of the MAC address table 54 store the MAC addresses that have been learned with the high priority or the medium priority, the table control unit 33 brings the processing to an end without learning the transmission source MAC address of the received frame.

S91 to S93 in the learning process F are similar to S51 to S53 in the learning process B illustrated in FIG. 15, respectively. In the learning process F, however, the transmission source MAC address of the received frame is learned with the low priority. Accordingly, the learning process F is different from the learning process B in the following points.

In S91, the table control unit 33 selects one entry where the MAC address is stored with the low priority, and stores the transmission source MAC address of the received frame in the selected entry. At that time, "learning priority=low" is set for the entry selected for a new MAC address. In S93, the table control unit 33 increments, in the VLAN learning counter 52, the learning number (low) corresponding to the service ID of the received frame and further increments the total learning number (low) in the entire learning counter 53.

If the determinations in S25, S29, and S33 are all "No", the learning of the transmission source MAC address of the received frame is not performed. In other words, if the learning numbers at all the priorities reach the corresponding learning upper limit number for the service ID of the received frame, the table control unit 33 does not learn the transmission source MAC address of the relevant received frame.

In the third embodiment, as described above, the transmission source MAC address of the received frame is learned with the highest learning priority among the learning priorities at each of which the learning number is smaller than the learning upper limit number. For example, when the learning number (high) is smaller than the learning upper limit number (high) in the virtual LAN corresponding to the received frame, the switch unit 12 learns the transmission source MAC address of the relevant received frame with the high priority. When the learning number (high) reaches the learning upper limit number (high) and the learning number (medium) is smaller than the learning upper limit number (medium), the switch unit 12 learns the transmission source MAC address of the relevant received frame with the medium priority. Furthermore, when the learning number (high) and the learning number (medium) reach the learning upper limit number (high) and the learning upper limit number (medium), respectively, and the learning number (low) is smaller than the learning upper limit number (low), the switch unit 12 learns the transmission source MAC address of the relevant received frame with the low priority.

In the first and second embodiments, when the learning number for some one user reaches the learning upper limit number, the switch unit 12 does not learn the MAC address for the relevant user even when there is a blank entry in the MAC address table. On the other hand, in the third embodiment, for example, even when the learning number with the high priority for some one user reaches the learning upper limit number, the switch unit 12 is able to learn the MAC address with another priority for the relevant user. Accordingly, congestion of the network is reduced by properly determining the learning upper limit number at each priority per user, while efficiently utilizing the MAC address table.

An address learning method according to the third embodiment will be described below with reference to an example of setting for the learning upper limit number illustrated in FIG. 20. In the example illustrated in FIG. 20, virtual LANs (VID=#1, #3, #5, #7 and #9) are provided to five users. The maximum entry number of the MAC address table 54 is 10000.

In the example illustrated in FIG. 20, a total learning upper limit number with the high priority is 8000 that is smaller than the maximum entry number of the MAC address table 54. In such a case, the address learning with the high priority is executable at all times regardless of the state of the MAC address table 54. Stated in another way, when a total learning upper limit number with the high priority is smaller than the maximum entry number of the MAC address table 54, the address learning with the high priority is ensured. For example, the learning of 4000 MAC addresses is ensured for each of the virtual LANs #1 and #3. Thus, the MAC addresses of the virtual LANs #1 and #3 are learned with higher priority than those of the other virtual LANs. This implies that service levels provided to the users of the virtual LANs #1 and #3 are higher than those provided to the other users.

When a large number of MAC addresses are learned with the high priority, the number of MAC addresses allowed to be learned with the medium priority or the low priority is reduced. For example, when total 8000 MAC addresses are learned with the high priority for the virtual LANs #1 and #3, the number of MAC addresses allowed to be learned with the medium priority or the low priority is 2000. In such a case, the address learning number for each of the virtual LANs #5 and #7 is limited to a value smaller than the corresponding learning upper limit number. Thus, service levels provided to the users of the virtual LANs #5 and #7 are lower than those provided to the users of the virtual LANs #1 and #3.

Only the address learning with the low priority is allowed for the virtual LAN #9. Therefore, when a total of the address learning numbers with the high priority and the medium priority reaches the maximum entry number of the MAC address table 54, the learning of the MAC address for the virtual LAN #9 is rejected. In such a case, the determination result in S90 in the flowchart of FIG. 19 is "No". Thus, a service level provided to the user of the virtual LAN #9 is lower than those provided to the users of the virtual LANs #1, #3, #5 and #7. For example, best effort service is applied to the user for whom only the address learning with the low priority is allowed. In that case, a communications firm may contract with the relevant user at a lower charge.

A total learning upper limit number with each of the medium priority and the low priority may be larger than the maximum entry number of the MAC address table 54. In such a case, the learning of the MAC address is performed while the individual virtual LANs (or the individual users) share the MAC address table 54.

The sum of the respective learning upper limit numbers with the high priority, the medium priority, and the low priority, which are set for each virtual LAN (or each user) may be the same as the maximum entry number of the MAC address table 54. In such a case, one user is able to utilize all the entries of the MAC address table 54 when the other users are in state out of communications.

Fourth Embodiment

A fourth embodiment is related to an aging process for the MAC address registered in the MAC address table. The aging process according to the fourth embodiment is executed, for example, in the communication device illustrated in FIG. 11.

In the fourth embodiment, as illustrated in FIG. 12A, the aging time is set in plural values for each virtual LAN. The plural values of the aging time set for each virtual LAN correspond to the above-described plural learning priorities, respectively. In the following description, three values of the aging time set for each virtual LAN corresponding to the three learning priorities are also denoted as an "aging time (high)", an "aging time (medium)", and an "aging time (low)", respectively.

The MAC address registered in the MAC address table 54 with the high priority is deleted at a time after the corresponding aging time (high) has lapsed from the time of registration or update. Similarly, the MAC address registered in the MAC address table 54 with the medium priority is deleted at a time after the corresponding aging time (medium) has lapsed from the time of registration or update. The MAC address registered in the MAC address table 54 with the low priority is deleted at a time after the corresponding aging time (low) has lapsed from the time of registration or update.

The aging time preferably depends on the learning priority. For example, the aging time is longer at the higher learning priority and is shorter at the lower learning priority. In such a case, the MAC address having been learned with the higher priority is harder to be deleted from the MAC address table 54. Therefore, flooding is less apt to occur with the frame transfer to the MAC address having been learned with the higher priority. To the contrary, the MAC address having been learned with the lower priority is easier to be deleted from the MAC address table 54. Thus, the MAC address table 54 is more efficiently utilized by setting the aging time depending on the learning priority.

Figure 21:
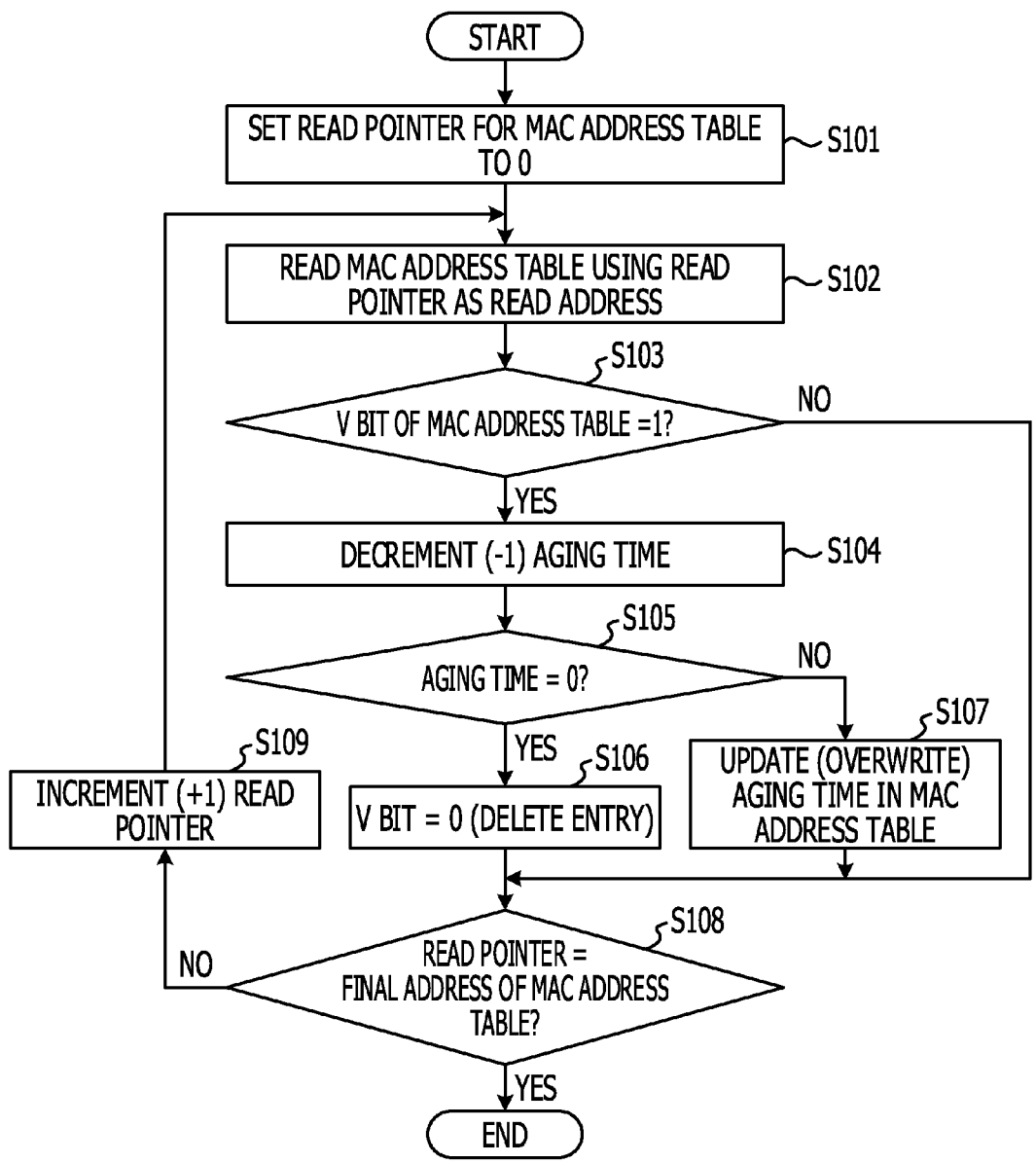
FIG. 21 is a flowchart illustrating one example of an aging process.

FIG. 21 is a flowchart illustrating one example of the aging process. The aging process of this flowchart is executed by the table control unit 33. The aging process of this flowchart is executed periodically (for example, at intervals of 1 sec). In other words, the aging process of this flowchart is executed irrespective of a frame input. In the following description with reference to FIG. 21, the aging time is expressed in units of "second".

In S101, the table control unit 33 sets a read pointer for the MAC address table 54 to zero. In S102, the table control unit 33 reads a corresponding entry of the MAC address table 54 using the read pointer as a read address. In S103, the table control unit 33 checks a value of the effective bit (V) of the read entry.

If the effective bit is not "1", the processing executed by the table control unit 33 is shifted to S108. On the other hand, if the effective bit is "1", the table control unit 33 decrements the read aging time by "1" in S104. Thereafter, in S105, the table control unit 33 determines whether or not the aging time after the decrement is "0".

If the aging time is "0", the table control unit 33 updates the effective bit of the relevant entry to "0" in S106. As a result, the MAC address registered in the relevant entry is deleted. On the other hand, if the aging time is not "0", the table control unit 33 updates the aging time of the relevant entry in S107. At that time, the result of the decrement in S104 is written (overwritten) in the relevant entry.

In S108, the table control unit 33 determines whether or not the read point indicates the final address of the MAC address table 54. If the read point does not indicate the final address of the MAC address table 54, the table control unit 33 increments the read pointer in S109. Thereafter, the processing executed by the table control unit 33 is returned to S102. Thus, the processing of S103 to S107 is executed for each entry of the MAC address table 54.

In such a manner, the table control unit 33 periodically decrements the aging time in each entry of the MAC address table 54. As a result, the MAC address registered in the entry where the aging time has become zero is deleted.

Fifth Embodiment

In the first to third embodiments, the learning upper limit number of the MAC address is set per user (per port or virtual LAN). In a fifth embodiment, on the premise that the learning upper limit number of the MAC address is set per user, priority of the frame itself is further taken into consideration in the learning of the MAC address. The priority of each frame is specified by "Priority" contained in the VLAN tag illustrated in FIG. 3B. In the following description, the priority of the frame is also called "frame priority" for the sake of distinguishing the priority of the frame and the learning priority from each other.

Figure 22:
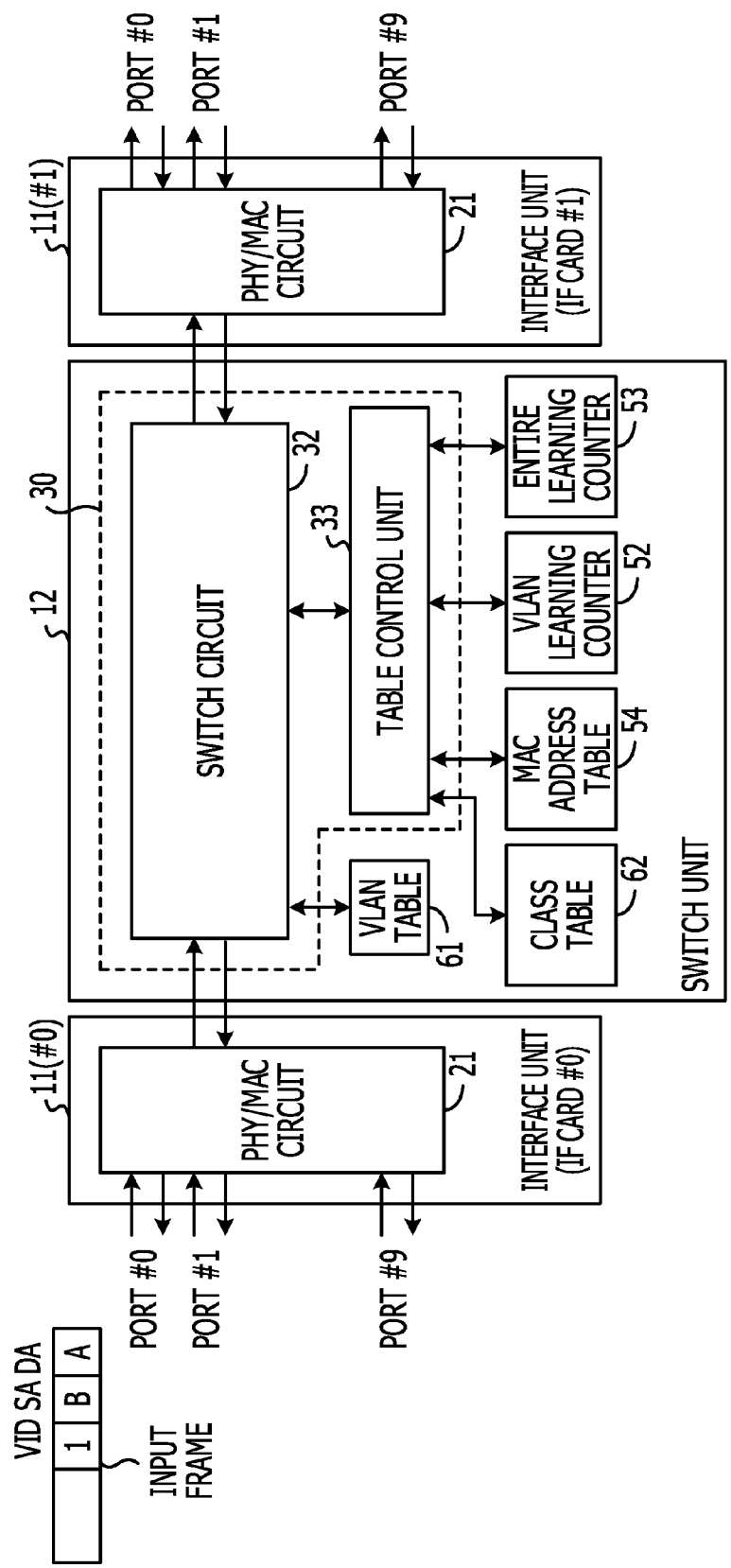
FIG. 22 illustrates one example of configuration of a communication device according to a fifth embodiment.

FIG. 22 illustrates one example of configuration of a communication device according to the fifth embodiment. The configuration of the communication device according to the fifth embodiment is substantially the same as that according to the third embodiment illustrated in FIG. 11. A switch unit 12 in the fifth embodiment includes a switch circuit 32, a table control unit 33, a VLAN table 61, a VLAN learning counter 52, an entire learning counter 53, a MAC address table 54, and a class table 62. The VLAN learning counter 52, the entire learning counter 53, and the MAC address table 54 are substantially the same in the third and fifth embodiments.

As illustrated in FIG. 23A, the VLAN table 61 stores an effective bit (V), a service ID, a class ID, a learning upper limit number, and an aging time with a VID being an index. Because the effective bit (V), the service ID, the learning upper limit number, and the aging time are substantially the same as those in the third embodiment, description thereof is omitted. Although the VLAN table 61 stores frame copy information similarly to the VLAN table 41 in the second embodiment, description of the VLAN table 61 is also omitted.

The class ID is determined for each virtual LAN in accordance with, for example, the contract between a user of the virtual LAN and a communications firm. In an example illustrated in FIG. 23A, a class 0 is set for a virtual LAN #0, and a class 1 is set for a virtual LAN #2. In the example illustrated in FIG. 23A, four classes are provided by the communication device.

As illustrated in FIG. 23B, the class table 62 manages the learning priority with the class ID and the frame priority being indexes. The learning priority includes three levels, namely high priority, medium priority, and low priority, as described above.

The switch unit 12 determines, based on both the virtual LAN to which the received frame belongs and the frame priority of the relevant received frame, the learning priority when the MAC address of the received frame is learned. For example, when "VID=#0" and "frame priority=7" are contained in the VLAN tag of the received frame, the switch unit 12 obtains "class ID=0" by searching the VLAN table 61 using "VID=#0". Then, the switch unit 12 obtains "learning priority=high" by searching the class table 62 using "class ID=0" and "frame priority=7". In such a manner, by referring to the class table 62, the switch unit 12 determines the learning priority when the transmission source MAC address of the received frame is learned.

FIG. 24 is a flowchart illustrating address learning in the fifth embodiment. Processing of this flowchart is executed when a frame is input to the switch unit 12.

S21 to S36 executed in the fifth embodiment are substantially the same as those in the third embodiment. However, the flowchart in the fifth embodiment includes S111 to S113 in addition to S21 to S36.

In S111, the table control unit 33 reads the class table 62. In other words, the table control unit 33 searches the class table 62 using the class ID and the frame priority. The class ID is obtained by searching, in S21, the VLAN table 61 using the VID of the received frame. The frame priority is obtained from the VLAN tag of the received frame. With the search in S111, the table control unit 33 specifies the learning priority used when learning the transmission source MAC address of the received frame.

When the transmission source MAC address of the received frame is not yet learned (S24: No), the table control unit 33 determines, in S112 to S113, a process to be executed depending on the learning priority. In more detail, when the learning priority is "high", the processing executed by the table control unit 33 is shifted to S25. When the learning priority is "medium", the processing executed by the table control unit 33 is shifted to S29. When the learning priority is neither "high" nor "medium", the processing executed by the table control unit 33 is shifted to S33.

When the learning priority is "high", the table control unit 33 learns the transmission source MAC address of the received frame through the learning process A illustrated in FIG. 14 or the learning process B illustrated in FIG. 15. In that case, the MAC address is learned with the high priority. However, if the current learning number (high) reaches the learning upper limit number (high) in S25, the table control unit 33 brings the processing to an end without learning the transmission source MAC address of the received frame.

When the learning priority is "medium", the table control unit 33 learns the transmission source MAC address of the received frame through the learning process C illustrated in FIG. 16 or the learning process D illustrated in FIG. 17. In that case, the MAC address is learned with the medium priority. However, if the current learning number (medium) reaches the learning upper limit number (medium) in S29, the table control unit 33 brings the processing to an end without learning the transmission source MAC address of the received frame.

When the learning priority is "low", the table control unit 33 learns the transmission source MAC address of the received frame through the learning process E illustrated in FIG. 18 or the learning process F illustrated in FIG. 19. In that case, the MAC address is learned with the low priority. However, if the current learning number (low) reaches the learning upper limit number (low) in S33, the table control unit 33 brings the processing to an end without learning the transmission source MAC address of the received frame.

When the received frame does not include the VLAN tag, the switch unit 12 executes the address learning process by assigning predetermined frame priority (for example, zero) to the relevant received frame. Such a method enables the switch unit 12 to determine the learning priority and to execute the address learning in accordance with the flowchart illustrated in FIG. 24 even when the frame not including the VLAN tag is received.

In the third embodiment, as described above, the learning priority is determined irrespective of the priority of the frame itself. Such a method is based on the policy that the frame having the high frame priority may not be assigned with the high learning priority in some cases. In the third embodiment, therefore, an address of a terminal or a server having higher communication frequency tends to be learned with the high priority and to be held in the MAC address table 54.

In the fifth embodiment, the learning priority is determined in consideration of the priority of the frame itself. Such a method is based on the policy that the high learning priority is to be assigned to the frame having the high frame priority. Selection of the third embodiment or the fifth embodiment is preferably determined depending on the policy of service provided by a communications firm and the demand of a user.

Sixth Embodiment

In the fifth embodiment, the learning priority is determined based on the frame priority, and the MAC address is learned with the determined learning priority. On that occasion, when the learning number with the determined learning priority reaches the learning upper limit number, the learning of the MAC address is not performed.

In a sixth embodiment, the learning priority is determined based on the frame priority and the MAC address is learned with the determined learning priority as in the fifth embodiment. In the sixth embodiment, however, even when the learning number with the determined learning priority reaches the corresponding learning upper limit number, the learning of the MAC address is performed if the learning number with lower learning priority does not reach the corresponding learning upper limit number. The configuration of a communication device is substantially the same in the fifth and sixth embodiments.

Figure 25:
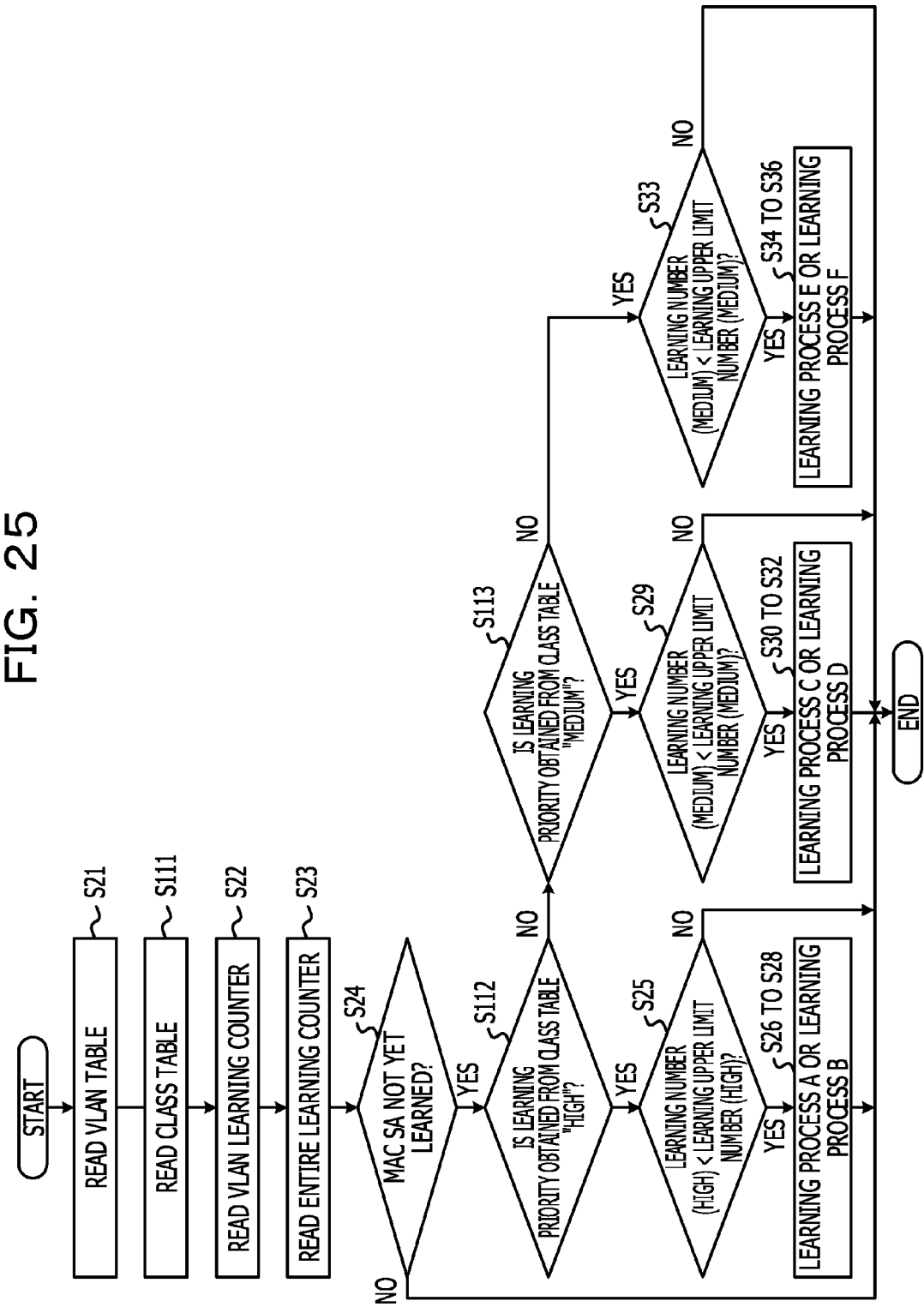
FIG. 25 is a flowchart illustrating address learning in a sixth embodiment.

FIG. 25 is a flowchart illustrating address learning in the sixth embodiment. Processing of this flowchart is executed when a frame is input to the switch unit 12.

In the sixth embodiment, as illustrated in FIG. 25, if the learning number (high) reaches the learning upper limit number (high) (S25: No), the processing executed by the table control unit 33 is shifted to S29. If the learning number (medium) reaches the learning upper limit number (medium) (S29: No), the processing executed by the table control unit 33 is shifted to S33. Other processes are substantially the same in the fifth and sixth embodiments.

Thus, in the sixth embodiment, whether or not the learning of the MAC address is enabled is flexibly determined. Accordingly, the MAC address table 54 is more efficiently employed.

Other Embodiments

As described above in connection with the examples illustrated in FIGS. 11 to 25, the learning upper limit number is set for the virtual LAN in the third to sixth embodiments. However, the learning upper limit number may be set for a physical port or a logical port in the third to sixth embodiments.

While, in the example illustrated in FIG. 6, one or plural physical ports are set corresponding to each logical port (port ID) and the learning upper limit number is set per logical port, the embodiment is not limited to such a configuration. In other words, the embodiment may include a configuration that the learning upper limit number is set per physical port. In that case, the learning number for the MAC address is limited per user by constructing a network such that one physical port accommodates only one user.

In the examples illustrated in FIGS. 9A, 12A and 23A, one or plural virtual LANs are prepared corresponding to each service ID and the learning upper limit number is set per service ID. However, the embodiment is not limited to such a configuration. In other words, the embodiment may include a configuration that the learning upper limit number is set per virtual LAN.

While, in the above-described embodiments, the MAC address is learned in the communication device for transferring the frame, the embodiments are not limited to such a configuration. In other words, the embodiments may also be practiced as communication devices for learning other addresses contained in frames.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
a first memory configured to store transfer information for controlling frame transfer;
a processor configured to register a transmission source address of a received frame and corresponding transfer information in the first memory; and
a second memory configured to store an upper limit number of registrable addresses for each of designated groups,
wherein the processor is configured to determine whether or not the transmission source address of the received frame is registrable in the first memory, based on a result of comparison between a number of registered addresses in a group corresponding to the received frame and an upper limit number assigned to the group corresponding to the received frame, wherein
the second memory stores, for each of the groups, a first upper limit number representing an upper limit number of addresses registrable with a first learning priority, and a second upper limit number representing an upper limit number of addresses registrable with a second learning priority that is lower than the first learning priority, and the processor is configured to:
determine that the transmission source address of the received frame is registrable, when a number of addresses registrable with the first learning priority in the group corresponding to the received frame is smaller than the first upper limit number assigned to the group corresponding to the received frame; and
determine whether or not the transmission source address of the received frame is registrable in the first memory, based on a result of comparison between a number of addresses registered with the second learning priority in the group corresponding to the received frame and the second upper limit number assigned to the group corresponding to the received frame when the number of addresses registered with the first learning priority in the group corresponding to the received frame reaches the first upper limit number assigned to the group corresponding to the received frame.

2. The communication device according to claim 1, wherein the second memory stores, for each of the groups, an upper limit number of registrable addresses with respect to each of plural learning priorities that represent priorities of address registration to the first memory.

3. The communication device according to claim 2, wherein the processor is configured to register the transmission source address of the received frame with highest learning priority among the learning priorities at each of which the number of registered addresses is smaller than the corresponding upper limit number.

4. The communication device according to claim 1, wherein the processor is configured to determine that the transmission source address of the received frame is not registrable in the first memory, when the number of registered addresses in the group corresponding to the received frame reaches the upper limit number assigned to the group corresponding to the received frame.

5. The communication device according to claim 1, wherein the processor is configured to store the transmission source address of the received frame and the corresponding transfer information in a blank entry of the first memory, when the number of addresses registered with the first learning priority in the group corresponding to the received frame is smaller than the first upper limit number assigned to the group corresponding to the received frame and when a total number of addresses registered with the first learning priority in the individual groups is smaller than a maximum entry number of the first memory.

6. The communication device according to claim 1, wherein the processor is configured to store the transmission source address of the received frame and the corresponding transfer information in one of a plurality of entries in which addresses are registered with the second learning priority, when the number of addresses registered with the first learning priority in the group corresponding to the received frame is smaller than the first upper limit number assigned to the group corresponding to the received frame and when a total number of addresses registered with the first learning priority in the individual groups is smaller than a maximum entry number of the first memory.

7. The communication device according to claim 1, wherein the processor is configured to store the transmission source address of the received frame and the corresponding transfer information in one of a plurality of entries in which addresses are registered with the first learning priority, when the number of addresses registered with the first learning priority in the group corresponding to the received frame is smaller than the first upper limit number assigned to the group corresponding to the received frame and when a total number of addresses registered with the first learning priority in all the groups reaches a maximum entry number of the first memory.

8. The communication device according to claim 1, wherein the processor is configured to:
- select the learning priority based on both the group corresponding to the received frame and frame priority assigned to the received frame; and
- determine whether or not the transmission source address of the received frame is registrable in the first memory, based on a result of comparison between a number of addresses registered with the selected learning priority and the upper limit number corresponding to the selected learning priority and assigned to the group corresponding to the received frame.

9. The communication device according to claim 8, wherein the processor is configured to convert the frame priority, which is assigned to the received frame, to the corresponding learning priority.

10. The communication device according to claim 1, wherein the second memory stores, for each of the groups, a first aging time representing a time during which the addresses registered with the first learning priority are to be held in the first memory, and a second aging time representing a time during which the addresses registered with the second learning priority are to be held in the first memory, and the processor is configured to:
- execute an aging process for the addresses, which are registered with the first learning priority in the first memory, based on the first aging time; and
- execute an aging process for the addresses, which are registered with the second learning priority in the first memory, based on the second aging time.

11. The communication device according to claim 1, further comprising:
- a plurality of communication ports each configured to receive and transmit a frame,
- wherein the groups are each designated based on identification information to identify each communication port.

12. The communication device according to claim 1, wherein the groups are each designated based on identification information to identify one of a user and a network, the identification information being contained in each frame.

13. An address learning method to register a transmission source address of a received frame, executed by a processor configured to register a transmission source address of a received frame and corresponding transfer information for controlling frame transfer in a first memory, the address learning method comprising:
- storing, for each of the groups, a first upper limit number representing an upper limit number of addresses registrable with a first learning priority, and a second upper limit number representing an upper limit number of addresses registrable with a second learning priority that is lower than the first learning priority, in a second memory;
- receiving a frame;
- determining that the transmission source address of the received frame is registrable, when a number of addresses registrable with the first learning priority in the group corresponding to the received frame is smaller than the first upper limit number assigned to the group corresponding to the received frame; and
- determining whether or not the transmission source address of the received frame is registrable in the first memory, based on a result of comparison between a number of addresses registered with the second learning priority in the group corresponding to the received frame and the second upper limit number assigned to the group corresponding to the received frame when the number of addresses registered with the first learning priority in the group corresponding to the received frame reaches the first upper limit number assigned to the group corresponding to the received frame.

14. An address learning method according to claim 13, further comprising
- determining that the transmission source address of the received frame is not registrable in the first memory, when the number of registered addresses in the group corresponding to the received frame reaches the upper limit number assigned to the group corresponding to the received frame.

15. The address learning method according to claim 14, further comprising
- storing the transmission source address of the received frame and the corresponding transfer information in a blank entry of the first memory, when the number of addresses registered with the first learning priority in the group corresponding to the received frame is smaller than the first upper limit number assigned to the group corresponding to the received frame and when a total number of addresses registered with the first learning priority in the individual groups is smaller than a maximum entry number of the first memory.

16. The address learning method according to claim 14, further comprising
- storing the transmission source address of the received frame and the corresponding transfer information in one of a plurality of entries in which addresses are registered with the second learning priority, when the number of addresses registered with the first learning priority in the group corresponding to the received frame is smaller than the first upper limit number assigned to the group corresponding to the received frame and when a total number of addresses registered with the first learning priority in the individual groups is smaller than a maximum entry number of the first memory.

17. The address learning method according to claim 14, further comprising
- storing the transmission source address of the received frame and the corresponding transfer information in one of a plurality of entries in which addresses are registered with the first learning priority, when the number of addresses registered with the first learning priority in the group corresponding to the received frame is smaller than the first upper limit number assigned to the group corresponding to the received frame and when a total number of addresses registered with the first learning priority in all the groups reaches a maximum entry number of the first memory.

18. The address learning method according to claim 14, further comprising
- selecting the learning priority based on both the group corresponding to the received frame and frame priority assigned to the received frame; and
- determining whether or not the transmission source address of the received frame is registrable in the first memory, based on a result of comparison between a number of addresses registered with the selected learning priority and the upper limit number corresponding to the selected learning priority and assigned to the group corresponding to the received frame.

19. The address learning method according to claim 18, further comprising converting the frame priority, which is assigned to the received frame, to the corresponding learning priority.

\* \* \* \* \*